(12) United States Patent
Bang et al.

(10) Patent No.: US 11,774,919 B2
(45) Date of Patent: Oct. 3, 2023

(54) DISTRIBUTED AND SCALABLE ALL-DIGITAL LOW DROPOUT INTEGRATED VOLTAGE REGULATOR

(71) Applicant: Intel Corporation, Santa Clara, CA (US)

(72) Inventors: Suyoung Bang, Hillsboro, OR (US); Wootaek Lim, Ann Arbor, MI (US); Eric Samson, Folsom, CA (US); Charles Augustine, Portland, OR (US); Muhammad Khellah, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 271 days.

(21) Appl. No.: 17/125,768

(22) Filed: Dec. 17, 2020

(65) Prior Publication Data

US 2021/0240142 A1 Aug. 5, 2021

Related U.S. Application Data

(60) Provisional application No. 62/970,650, filed on Feb. 5, 2020.

(51) Int. Cl.
*G05B 11/42* (2006.01)
*G05B 11/12* (2006.01)
*G05F 1/46* (2006.01)

(52) U.S. Cl.
CPC ............... *G05B 11/12* (2013.01); *G05F 1/46* (2013.01)

(58) Field of Classification Search
CPC .................................. G05B 11/42; G05F 1/46
USPC ........................................................... 323/299
See application file for complete search history.

(56) References Cited

U.S. PATENT DOCUMENTS

| | | | | |
|---|---|---|---|---|
| 7,737,566 | B2 * | 6/2010 | Van Haren | G03F 9/7076 |
| | | | | 430/5 |
| 11,211,935 | B2 * | 12/2021 | Bang | H03L 7/0814 |
| 11,320,888 | B2 * | 5/2022 | Augustine | H02M 3/157 |
| 11,444,532 | B2 * | 9/2022 | Liu | G05F 1/571 |

OTHER PUBLICATIONS

Kim, Doyun et al., "0.5V-VIN, 165-mA/mm^2 Fully-Integrated Digital LDO based on Event-Driven Self-Triggering Control", 2018 Symposium on VLSI Circuits Digest of Technical Papers, 2 pgs.

(Continued)

*Primary Examiner* — Yemane Mehari
(74) *Attorney, Agent, or Firm* — NICHOLSON DE VOS WEBSTER ELLIOTT LLP

(57) ABSTRACT

A distributed and scalable all-digital LDO (D-DLDO) voltage regulator allowing rapid scaling across technology nodes. The distributed DLDO includes many tillable DLDO units regulating a single supply voltage with a shared power distribution network (PDN). The D-DLDO includes an all-digital proportional-integral-derivative (PID) controller that receives a first code indicative of a voltage behavior on a power supply rail. A droop detector is provided to compare the first code with a threshold to determine a droop event, wherein information about the droop event is provided to the PID controller, wherein the PID controller generates a second code according to the first code and the information about the droop event. The DLDO includes a plurality of power gates that receive the second code.

21 Claims, 15 Drawing Sheets

(56) References Cited

OTHER PUBLICATIONS

Kim, Sung J. et al., "A 0.5-1V Input Event-Driven Multiple Digital Low-Dropout-Regulator System for Supporting a Large Digital Load", 2019 Symposium on VLSI Circuits Digest of Technical Papers, 2 pgs.
Lu, Yasu et al., "A 500mA Analog-Assisted Digital-LDO-Based On-Chip Distributed Power Delivery Grid with Cooperative Regulation and IR-Drop Reduction in 65nm Cmos", ISSCC 2018, Session 18, Adaptive Circuits and Digital Regulators, 3 pgs.
Okuma, Yasuyuki et al., "0.5-V Input Digital LDO with 98.7% Current Efficiency and 2.7-uA Quiescent Current in 65nm Cmos", IEEE, CICC, Sep. 2010, 4 pgs.
Perez, Miguel E. et al., "Distributed Network of LDO Microregulators Providing Submicrosecond DVFS and IR Drop Compensation for a 24-Core Microprocessor in 14nm SOI CMOS", IEEE CICC, Apr. 2019, 4 pgs.

\* cited by examiner

DISTRIBUTED AND SCALABLE ALL-DIGITAL LOW DROPOUT INTEGRATED VOLTAGE REGULATOR

CLAIM OF PRIORITY

This application claims priority of U.S. Provisional Application No. 62/970,650 titled "Distributed and Scalable All-Digital Low Dropout Integrated Voltage Regulator," filed Feb. 5, 2020, which is herein incorporated by reference in its entirety.

BACKGROUND

A digitally controlled LDO (DLDO) cost effectively enables fine-grain voltage regulation for digital IP (intellectual property) blocks. However, large local IR drop across the power delivery network (PDN) in a large IP (e.g., a few mm$^2$), coupled with fast local transient droop/overshoot, can make a single point voltage regulator solution less effective, necessitating larger voltage guard-band with associated loss in operational efficiency (performance/Watt).

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
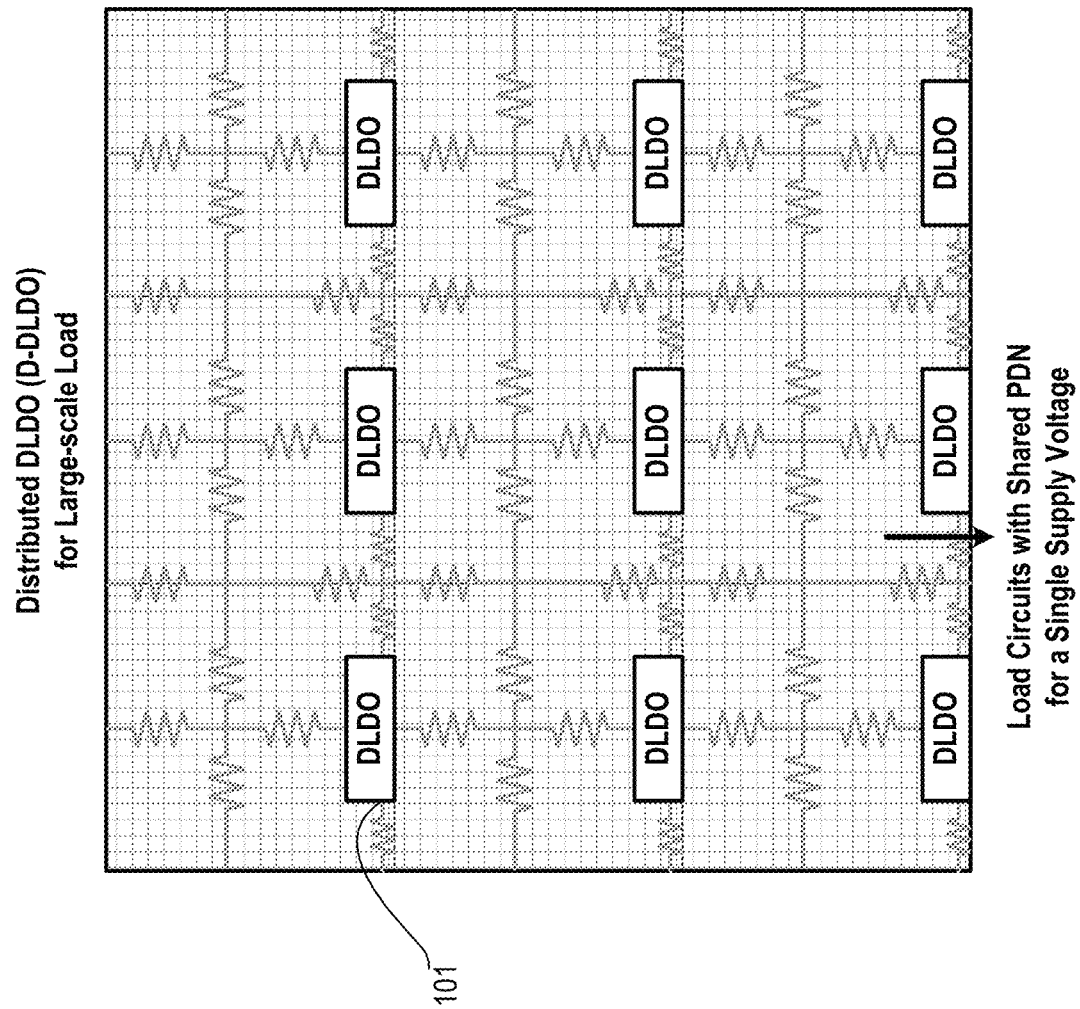
FIG. 1 illustrates a distributed D-DLDO voltage regulator architecture, in accordance with some embodiments.

For better point-of-load regulation with improvement to both local IR-drop and local transients, distributed LDO architectures are used, where a number of dispersed LDO units (sharing the same power distribution network) work in unison to supply a single domain. In traditional distributed LDO architectures, custom communication between a global controller and multiple locally distributed LDO controllers, custom communication between neighboring LDO controllers, and/or analog voltage sensors with associated reference voltage ($V_{REF}$) generation and routing are used. These features make the LDO a non-scalable design over process technology nodes Some embodiments propose a new distributed and scalable all-digital LDO (D-DLDO) voltage regulator allowing rapid scaling across technology nodes. The distributed DLDO includes many tillable DLDO units regulating a single supply voltage with a shared power distribution network (PDN). Having an all-digital distributed LDO scheme can enable better transient response (e.g., shorter loop delay), better spatial uniformity of the regulated voltage while being easy for integration as it requires no global/inter-DLDO communication as well as no analog voltage generation and routing. The D-DLDO of various embodiments is built with all-digital standard cells, making it APR-friendly where layout can be easily generated with industry-standard tool(s) without manual design efforts of layout designers. The D-DLDO of various embodiments is IP- and process-agnostic, enabling rapid development of integrated voltage regulators on a variety of technology process nodes. D-DLDO ensures not only stable voltage regulation with proper selection of PID-control gains, controller frequency, and/or dead-band, but also fast droop response time of one (domain) clock cycle thanks to the fast droop detection and mitigation.

The DLDO voltage regulator of some embodiments has an all-digital PID-based controller, APR-friendly and tileable design without the need to generate or route any global or inter-LDO digital/analog signals, and fast transient droop response. Here, PID controller refers to proportional-integral-derivative controller, and APR refers to automatic placement and routing. Some embodiments use on-die voltage monitors with the DLDO.

On-die voltage monitors provide a means to observe the behavior of a voltage rail (e.g., power supply rail Vcc) of a given computing intellectual property (IP) block while executing diverse workloads. An all-digital voltage monitor (ADVM) is easily instantiated as many times as needed inside the IP block providing insights into local hot spots. Here, the term "Intellectual Property Block" or "IP Block" generally refers to a reusable unit of logic, cell, or integrated circuit layout design that is the intellectual property of one party. IP blocks such as a IP processing cores may be licensed to another party or can be owned and used by a single party alone. An ADVM is both IP and process agnostic enabling rapid development of a critical post-silicon debug feature independent of a given technology and IP architecture. An ADVM quickly and accurately detects a local fast supply voltage droop. A supply voltage droop degrades maximum IP frequency, or necessitates higher voltage guard band with associated power cost. A fast-local droop detection combined with some local droop mitigation (e.g., local instruction throttling or local charge injection) reduces the impact of the droop on maximum frequency (Fmax) or minimum operating voltage (Vmin).

The ADVM of various embodiments, has multi-bit resolution and single cycle latency. The ADVM of some embodiments generates a multi-bit output code that changes in proportion to a monitored voltage, by leveraging the voltage impact on a gate delay. In some embodiment, the ADVM utilizes a simple delay chain, which receives a clock-cycle-long pulse every clock cycle, such that the monitored supply voltage is sampled for one full cycle every cycle. The outputs of all delay cells of the delay chain collectively represents a current voltage state as a digital thermometer code. In the AVDM, a voltage droop event thus results in a decrease in the output code from a nominal value, while an overshoot results in an increase in the output code. To address any possible aliasing noise for distributed droop detection, various embodiments apply bubble insertion for fast droop mitigation.

In some embodiments, an apparatus is provided which comprises a first circuitry to monitor a supply voltage and to generate a first code indicative of a digital representation of the supply voltage. In some embodiments, the apparatus comprises a second circuitry to receive the first code and to determine whether the supply voltage drooped, and to generate a droop indication if the supply voltage drooped. The apparatus further comprises a third circuitry to receive the first code or a version of the first code along with the droop indication, wherein the third circuitry is to generate a second code according to the first code or a version of the first code and the droop indication. The apparatus includes power gates (PGs) coupled to an input supply voltage rail and an output supply voltage rail, wherein the PGs are controlled by the second code or a version of the second code.

In some embodiments, the first circuitry comprises an all-digital voltage monitor. The all-digital voltage monitor includes a frequency divider to receive an input clock and to generate a frequency divided clock. The all-digital voltage monitor includes a delay chain comprising delay cells, wherein the delay chain is to receive the frequency divided clock at an input of the delay chain. The all-digital voltage monitor includes a plurality of sequential circuitries, wherein each of the sequential circuitries is coupled to an output of an individual delay cell of the delay chain. The all-digital voltage monitor also includes a selection circuitry coupled to the plurality of sequential circuitries, wherein the selection circuitry includes a multiple of multiplexers, wherein each multiplexer is coupled to an individual sequential circuitry of the plurality of sequential circuitries. In some embodiments, the all-digital voltage monitor includes a circuitry to suppress metastability-induced bubble in outputs of the selection circuitry.

In some embodiments, the second circuitry includes: a comparator to compare the first code with a threshold and a multiplexer to receive an output of the comparator and an output of a sequential circuit, wherein an output of the multiplexer is input to the sequential circuit. In some embodiments, the second circuitry includes an OR logic gate coupled to the output of the sequential circuit and to the output of the multiplexer, wherein the output of the OR logic gate is the droop indication. In some embodiments, the third circuitry comprises a proportional-integral-derivative (PID) controller. In some embodiments, the PID controller is to asynchronously enable a predetermined number of PGs once the droop indication is realized. In some embodiments, the PID controller continues normal PID control to dial down strength of the PGs starting from the predetermined number of PGs for stable operation. In some embodiments, the predetermined number of PGs is a maximum number of PGs. In some embodiments, the first code is a thermometer code, and wherein the version of the first code is a binary code that represents the thermometer code. In some embodiments, the second code is a binary code, and wherein the version of the second code is a thermometer code that represents the binary code.

There are many technical effects of the various embodiments. For example, the DLDO enables distributed, and scalable all-digital LDO voltage regulator design for IP as well as process-agnostic rapid development because of its all-digital implementation. DLDO also reduces voltage guard-band, and improves energy efficiency of the load by improving IR-drop, and transient droop/overshoot responses. The DLDO in some embodiments uses an ADVM which is a simple APR-friendly design that may not need any tunable gate delay element (e.g. logic, interconnect, memory, etc), making it IP agnostic, while enabling rapid development independent of the given process technology. The DLDO of some embodiments are provided using APR.

Here, the term APR generally refers to an automatic placement and routing scheme. Tools for APR are used to layout digital integrated circuits, which include digital standard library cells such as buffer, inverter, AND gate, NAND gate, OR gate, NOR gate, multiplexer, flip-flop (FF), etc. Digital standard-cell libraries provide pre-designed layouts of digital standard cells for APR. Most of digital integrated circuits including microprocessors and graphics cores are built with industry-standard APR tools such as Synopsys® IC Compiler, and Cadence® Encounter. It uses digital circuits that generate digital signals as opposed to analog circuits that generate analog signals. As such, the ADVM generates an accurate representation of sampled voltage in multi-bit output code that can monitor a wide range of voltage changes (e.g., greater than 400 mV), at a fast response time of only one clock cycle latency. With comprehensive high-volume manufacturing (HVM) characterization flow, the ADVM monitors supply voltage accurately (e.g., with less than 7 mV error) across a very wide range of process-voltage-temperature (PVT) and IP clock frequency conditions. Other technical effects will be evident from the various figures and embodiments.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

It is pointed out that those elements of the figures having the same reference numbers (or names) as the elements of any other figure can operate or function in any manner similar to that described but are not limited to such.

FIG. 1 illustrates a distributed DLDO voltage regulator architecture 100, in accordance with some embodiments. In this example, the distributed DLDO (D-DLDO) voltage regulator architecture shows 9 DLDOs 101. DLDOs 101 are spread throughout the load or domain. DLDOs 101 are coupled to a power distribution network (PDN).

In some embodiments, DLDO or a controller of the DLDO comprises an all-digital proportional-integral-derivative (PID) controller that receives a first code indicative of a voltage behavior on a power supply rail. In some embodiments, the DLDO or a controller of the DLDO includes a droop detector to compare the first code with a threshold to determine a droop event, wherein information about the droop event is provided to the PID controller, wherein the PID controller generates a second code according to the first code and the information about the droop event. In some embodiments, the DLDO comprises a plurality of power gates that receive the second code.

In some embodiments, the droop detector comprises: a comparator to compare the first code with a threshold; and a multiplexer to receive an output of the comparator and an output of a sequential circuit, wherein an output of the multiplexer is input to the sequential circuit. In some embodiments, the droop detector comprises an OR logic gate coupled to the output of the sequential circuit and to the output of the multiplexer, wherein the output of the OR logic gate is the droop indication.

In some embodiments, the code is generated by an all-digital voltage monitor, which includes: a frequency divider to receive an input clock and to generate a frequency divided clock; a delay chain comprising delay cells, wherein the delay chain is to receive the frequency divided clock at an input of the delay chain; a plurality of sequential circuitries, wherein each of the sequential circuitries is coupled to an output of an individual delay cell of the delay chain; and a selection circuitry coupled to the plurality of sequential circuitries, wherein the selection circuitry includes a multiple of multiplexers, wherein each multiplexer is coupled to an individual sequential circuitry of the plurality of sequential circuitries.

In some embodiments, the all-digital voltage monitor includes a circuitry to suppress metastability-induced bubble in outputs of the selection circuitry. In some embodiments, the PID controller is to asynchronously enable a predetermined number of power gates once the droop indication is realized. In some embodiments, the PID controller continues normal PID control to dial down strength of the power gates starting from the predetermined number of power gates for stable operation. In some embodiments, the predetermined number of power gates is a maximum number of power gates.

Figure 2:
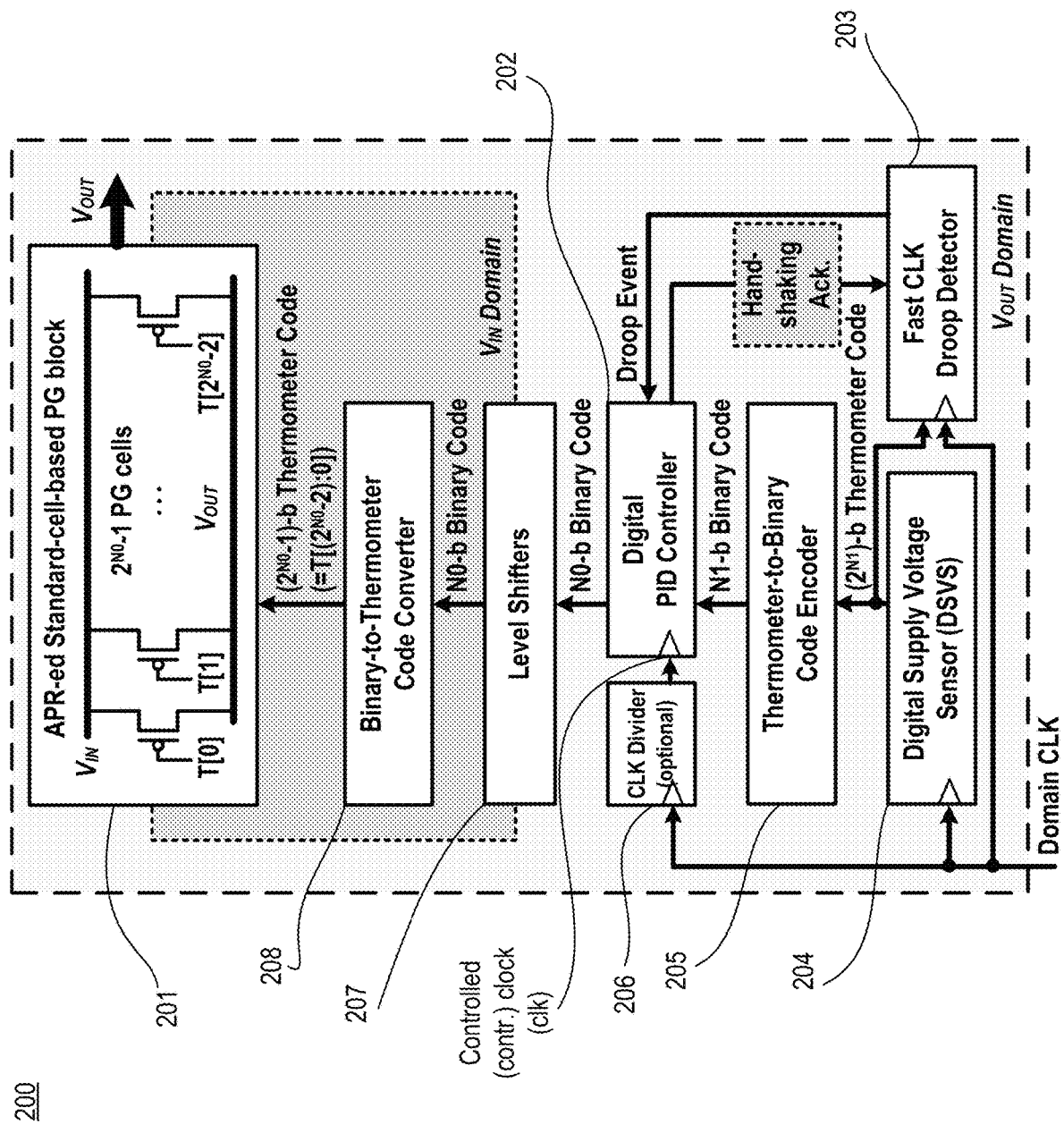
FIG. 2 illustrates a DLDO voltage regulator with digital PID controller, fast droop detector, and an all-digital voltage monitor (ADVM), in accordance with some embodiments.

FIG. 2 illustrates DLDO voltage regulator 200, in accordance with some embodiments. DLDO voltage regulator 200 comprises power-gates (PGs) 201, digital PID controller 202, fast droop detector 203, and an all-digital voltage monitor (ADVM) or digital supply voltage sensor (DSVS) 204. PGs 201 are illustrated as p-type devices coupled in parallel between input power supply rail (Vin rail) and output supply rail (Vout rail). In this example, PGs 201 are thermometer coded. However, PGs 201 can be binary coded. In some embodiments, PGs 201 include additional transistor(s) coupled in series with the p-type devices. These additional transistors may be controlled by a bias to adjust the overall current drive strength of power gates 201.

Power gates PG 201 are illustrated as p-type transistors coupled to an input power supply rail (or node) Vin and an output power supply rail Vout. However, other types of architectures can be used. In some embodiments, p-type transistors in series with linear resistors can be used for power gates. In some embodiments, p-type transistors in parallel with n-type transistors can be used as PGs. In some embodiments, p-type transistors with diode-connected p-type or n-type transistors in series can be used as PG. The D-DLDO scheme of various embodiments is not dependent on a particular type of PG. In some embodiments, PGs 201 are standard cells that are APR friendly.

PID controller 202 plays a central role in regulation of the output voltage $Y_{OUT}$, by utilizing the ADVM code as input, and accordingly setting the PG strength. Based on PID controller 202, the strength of PG 201 can be defined as $K_P \times e[n] + K_I \times \Sigma e[n] + K_D \times (e[n] - e[n-1])$, where $K_P$=proportional (P) gain, $K_I$=integral (I) gain, $K_D$=derivative (D) gain, $e[n]=CODE_{TARGET} - CODE_{OUT}[n]$, $CODE_{TARGET}$ is the ADVM digital code corresponding to $V_{TARGET}$, and $CODE_{OUT}[n]$ is the ADVM code representing $V_{OUT}[n]$, at time=$n \times T_{CLK}$, where $T_{CLK}$=ADVM clock period. In PID controller 202, the proportional (P) part helps respond to error largely, the integral (I) part helps reduce steady-state error, and the derivative (D) part helps reduce settling time.

While the embodiments use an all-digital voltage monitor (ADVM) 204, any suitable voltage monitor can be used that generated an output code indicative of the voltage behavior on a power supply node. The power supply node can be the output supply node Vout or the input supply node Vin.

In some embodiments, the gain PID controller 202 is set to enable stable operation of autonomous and independently controlled DLDO units in the proposed D-DLDO. The stability of a single DLDO unit needs first to be ensured while considering output load capacitance $C_{OUT}$, load current $I_{LOAD}$ range, input supply $V_{IN}$ range, output supply $V_{OUT}$ range, as well as worst-case di/dt. For example, a very large value of $K_P$ and/or $K_I$ can result in unstable steady state operation due to excessive response to errors. On the other hand, properly selected $K_P$ and/or $K_I$ gains can reduce droop/overshoot effects under sudden increase/decrease in load current while maintaining the overall stability of the DLDO. In D-DLDO, cross regulation among DLDO units 101 (as shown in FIG. 1) can further hurt stability, so extra caution is used in setting the gains of the PID-control while also considering other factors like the number of DLDO units and the $R_{PDN}$ defined as inter-tile PDN resistance.

In some embodiments, the voltage monitor is an ADVM or DSVS 204. In some embodiments, ADVM 204 generates a digital thermometer code every IP (domain) clock cycle where the code changes linearly in proportion to $V_{OUT}$. This thermometer code is provided to PID controller 202 in the form of a binary code. In some embodiments, PID controller 202 receives a thermometer code directly instead of a binary code. In some embodiments, ADVM 204 generates this thermometer code by utilizing a time-to-digital converter (TDC) made of a long inverter delay chain running off $V_{OUT}$. In some embodiments, the ADVM's $2^{N1}$-bit thermometer is encoded to N1 binary code, which is then fed into the PID controller for processing.

In various embodiments, ADVM 204 is fast (e.g., 1 cycle latency) and since it is distributed, there is minimal communication latency to the droop responding logic/power gates of the local DLDO unit. As such, the various components of the DLDO enable an all-digital stable, fast, and scalable DLDO design with no (or substantially zero) cross communication between unit DLDOs in the distributed system.

In some embodiments, PID gain parameters (e.g., $K_P$ and/or $K_I$) are set to guarantee overall D-DLDO stability under wide operating conditions while also providing fast response to transients. To improve droop response and decouple that from steady-state stability constraint, fast droop detection 203 and response are added.

In some embodiments, droop is detected by checking if the ADVM digital code is smaller than a pre-set droop threshold code, and if that is true, detector 203 immediately notifies the PID controller of a "droop event". PID controller 202 in turn asynchronously enables a preset "max" number of PGs and simultaneously sets "max" the "I" accumulator to the same "max" so that once "droop event" is de-asserted, PID controller 202 can continue normal PID control to dial down PG strength starting from the "max" value for stable operation. Note that the "droop event" signal is kept asserted by droop detector 203 until it receives an acknowledgement signal, "Ack", from PID controller 202 as the latter can run at slower clock frequency.

In various embodiments, PID controller 202, droop detector 203, ADVM 204, thermometer-to-binary converter 205, and clock dividers 206 operates on the output supply domain (e.g., Vout supply domain). The output of PID controller 202 is used to control PGs 201. Since PGs 201 are coupled to both Vin and Vout, the signals to control PGs 201 are level-shifted by level-shifters 207 from Vout domain to Vin domain. In various embodiments, PGs 201 are thermometer coded. In such a case, a binary-to-thermometer converter 208 is used to convert the PID output (after being level-shifted) to a thermometer code. In some embodiments, PID controller 202 receives a thermometer code and outputs a thermometer code. In such as a case, thermometer-to-binary converters 205 and binary-to-thermometer converters 208 can be removed.

The DLDO unit controller can be powered from $Y_{IN}$ or/from $V_{OUT}$ for a more efficient operation. For the latter case, NO-bit binary output code of PID controller 202 is first level-shifted to $V_{IN}$ level, and then converted to a thermometer code format for driving unary-sized power gates that are constructed with $2^{ND}-1$ instances of standard PG cell. Similar to the ADVM, the DLDO controller leverages that domain clock for its digital operation, albeit its clock can be divided down for more efficient steady-state operation and/or to enable stable regulations at a given operating condition. Besides properly setting the PID gain parameters and controller clock frequency, the stability of the proposed D-DLDO can be further enhanced by enabling a very narrow "dead-band" around the target $V_{OUT}$ (i.e. $CODE_{TARGET}$) such that a given DLDO unit stops adjusting its respective PGs if its $V_{OUT}$ falls within the dead-band which reduce cross loop interference.

Here, "dead-band" is a voltage region where the PID controller does not react to information from the ADVM and/or droop detector. In the dead-band, PG are left in their previous states because PID controller may not provide updated codes. In some embodiments, dead-band is implemented on top or in addition to PID controller 202 to reduce interactions between neighboring DLDO units and enhance overall stability of the D-DLDO. Dead-band is implemented with at least two comparators. The first comparator compares a first reference code with a code from the ADVM. The second comparator compares a second reference code with the code from the ADVM. The first reference code is higher (or large value) than the second reference code. In some embodiments, the first reference code is higher than $Code_{TARGET}$ and the second reference code is lower than the $Code_{TARGET}$. The output of the first and/or second comparators informs whether the code is in the dead band. In that case, PID controller 202 is halted, in some embodiments. When the ADVM code is higher than the first reference code or lower than the second reference code, then the outputs of the first and/or second compactors cause PID controller 202 to continue its normal operation, in accordance with some embodiments.

In some embodiments, if a hot spot location is known a priori, then the tile or tiles of the D-DLDO where this hot spot is located may have appropriately tuned $K_{P,I,D}$ parameters, larger number of power-gates for higher gain and larger $I_{MAX}$ (=maximum current of DLDO), and/or faster loop BW (lower IP clock division ratio for its steady-state local PID controller) to lower IR drop local to the hot-spot and/or to enable fast and proportional response to local load transients. Here, the term "hot-spot" refers to a region of a domain of the D-DLDO or die where load current is higher than other locations in the domain or die. The unit DLDO gain and speed can be adapted depending on known hot spots within the IP, in accordance with some embodiments.

The DLDO steady state may not use high clock speed. The bandwidth (BW) of the steady state mode of the DLDO to provide stable operation is within the slowest speed of a typical compute IP (intellectual property) during actual operation (e.g., 250-500 MHz). If the IP clock is running at a faster speed during high performance mode (HPM), then a simple clock division is used for the unit DLDO clock. The fast IP clock is used, however, for the fast droop detection as in accordance with various embodiments. In general, the voltage droop of the IP is proportional to its clock speed. As such, the undivided clock IP is used for fast droop detection in accordance with some embodiments.

In various embodiments, the DLDO stabilization is achieved by appropriately selecting PID parameters or coefficients. In some embodiments, the bandwidth of the DLDO is adjusted by modifying a loop delay. For example, the loop delay is adjusted by dividing down the clock frequency to the PID controller. Further, the DLDO stabilization is also achieved by narrowing the dead-band zone.

Figure 3:
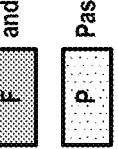
FIG. 3 illustrates an example showing PID coefficients with number of DLDO voltage regulator units, load current transition, and output capacitance, in accordance with some embodiments.

FIG. 3 illustrates an example 300 showing PID coefficients with number of DLDO units, load current transition, and output capacitance, in accordance with some embodiments. This example summarizes example stability test data obtained from a 3×3 D-DLDO test-chip showing how stability condition changes depending here on the number of DLDO units, di/dt transitions, and $C_{OUT}$ per DLDO unit.

Figure 4:
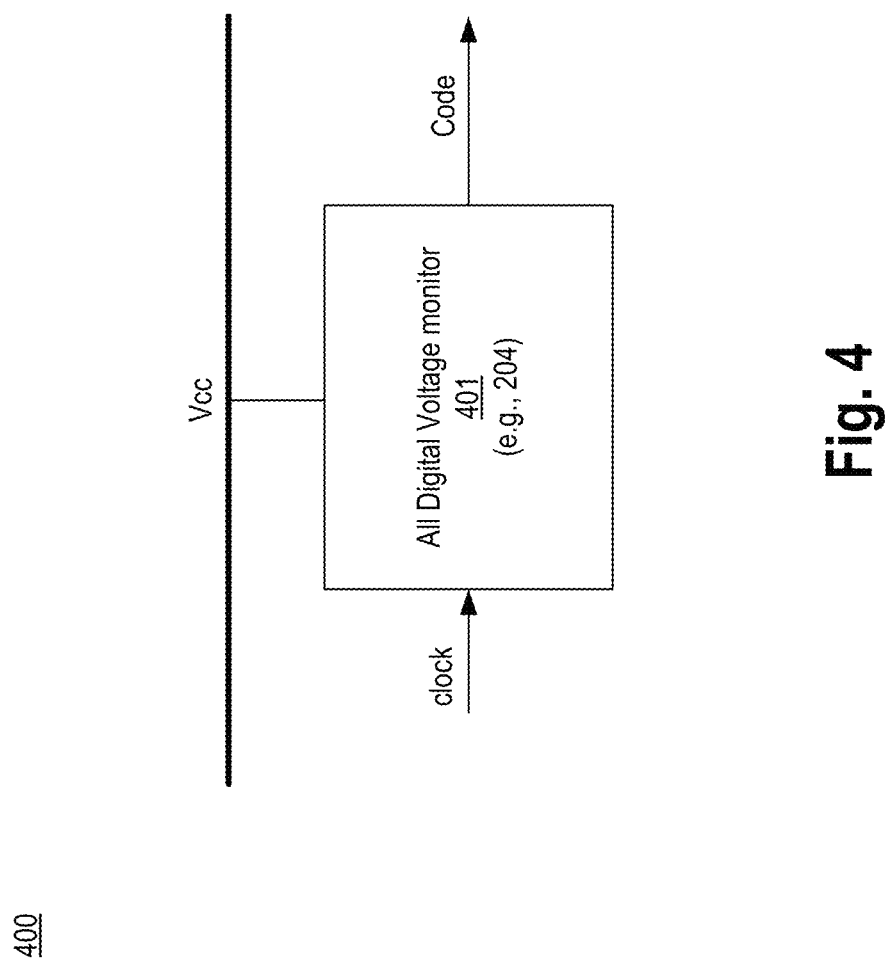
FIG. 4 illustrates a high-level usage architecture an ADVM that generates a digital code using a clock, in accordance with some embodiments.

FIG. 4 illustrates high-level usage architecture 400 an ADVM that generates a digital code using a clock, in accordance with some embodiments. Architecture 400 comprises an ADVM 401 (e.g., 204), which is IP agnostic. In some embodiments, ADVM 401 couples to a power supply rail Vcc to monitor any anomalies in the power supply voltage. Such anomalies include droop on Vcc, which is caused by power delivery network (PDN) resonance associated of effective resistance, parasitic inductance, and de-coupling capacitance of power delivery network because of a sudden load current increase due to activity change of logic or an IP powered by Vcc. Anomalies also include overshoot on Vcc, which is caused by Power Delivery Network (PDN) resonance associated of effective resistance, parasitic inductance, and de-coupling capacitance of PDN because of a sudden load current decrease due to activity change logic or an IP powered by Vcc. Anomalies also include slow change on $V_{CC}$ due to IR drop, where 'I' indicates load current of logic or an IP, and 'R' indicates effective resistance of the PDN. In some embodiments, ADVM 401 utilizes Vcc impact on gate delay (e.g., propagation delay through an inverter, buffer, or a similar logic gate) to monitor Vcc level. Gate delay increases with lower Vcc level.

In some embodiments, ADVM 401 comprises digital components such as buffers, inverters, flip-flops, multiplexers, AND/NAND gates to provide an accurate representation of sampled voltage in multi-bit output code that can monitor a wide range of voltage changes (e.g., greater than 400 mV), at a fast response time of only one clock cycle latency. In some embodiments, ADVM 401 uses a clock (e.g., an IP domain clock also referred to as domain clock) as input to generate a clock-cycle-long pulse that passes through an inverter delay chain, every cycle. Here, domain generally refers to a logic area such as a core, functional unit block (e.g., execution unit, arithmetic logic unit, floating-point unit, etc.) that operates using a particular clock and power supply. Domain clock is the clock to such logic area. In some embodiments, flip-flops sample inverters' states at every rising edge of the domain clock. For an odd cycle, high-phase of the divided clock passes through the delay chain, and for an even cycle, low-phase of the divided clock passes through the delay chain. Therefore, to generate consistent output codes every domain clock cycle, regardless of the clock phase passed to the chain, ADVM 401 uses polarity inversion of the code every other cycle. In some embodiments, simple multiplexors controlled by the divided clock implement polarity inversion of the code every other cycle.

In some embodiments, to suppress any flip-flop metastability-induced bubble in the code, ADVM 401 utilizes bubble suppression logic gates. The output Code of ADVM 401 is a digital code such as a thermometer code. However, the embodiments are not limited to a thermometer code. Other codes such as binary code and Gray encoded codes can be used.

Figure 5:
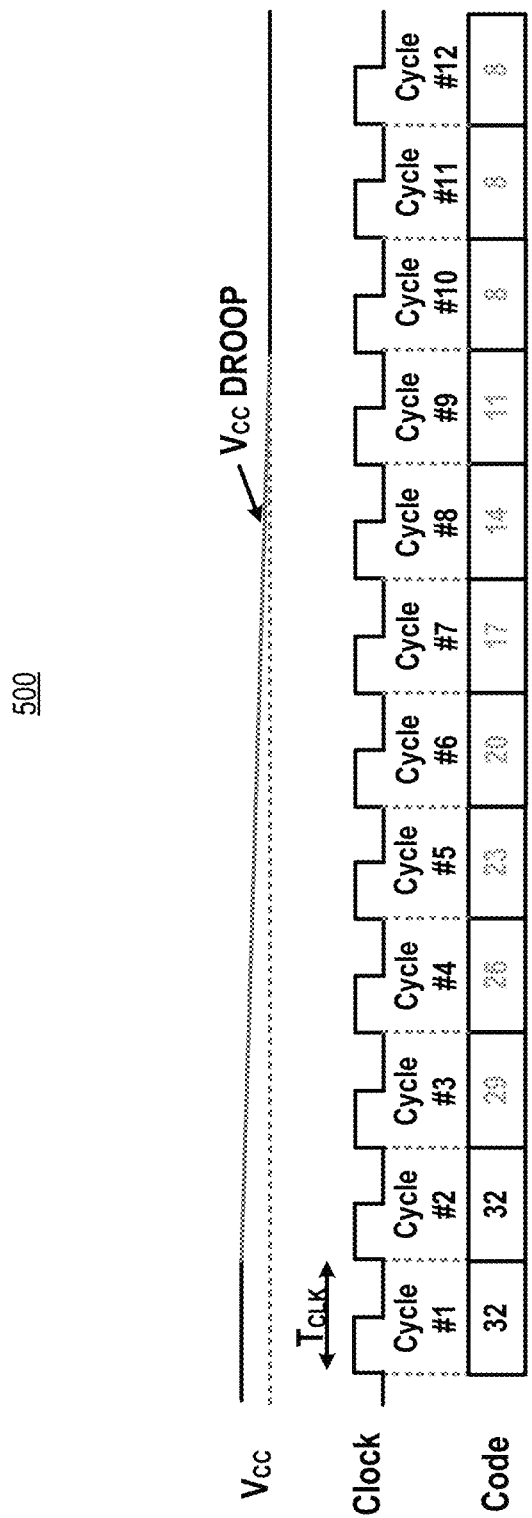
FIG. 5 illustrates a plot showing operation of the ADVM as it monitors voltage change in power supply node Vcc, in accordance with some embodiments.

FIG. 5 illustrates plot 500 showing operation of ADVM 401 (e.g., 204) as it monitors voltage change in power supply node Vcc, in accordance with some embodiments. In some embodiments, ADVM 401 generates multi-bit output Code that changes in proportion to Vcc. For instance, when Vcc continues to droop, ADVM output code decreases every cycle.

Figure 6:
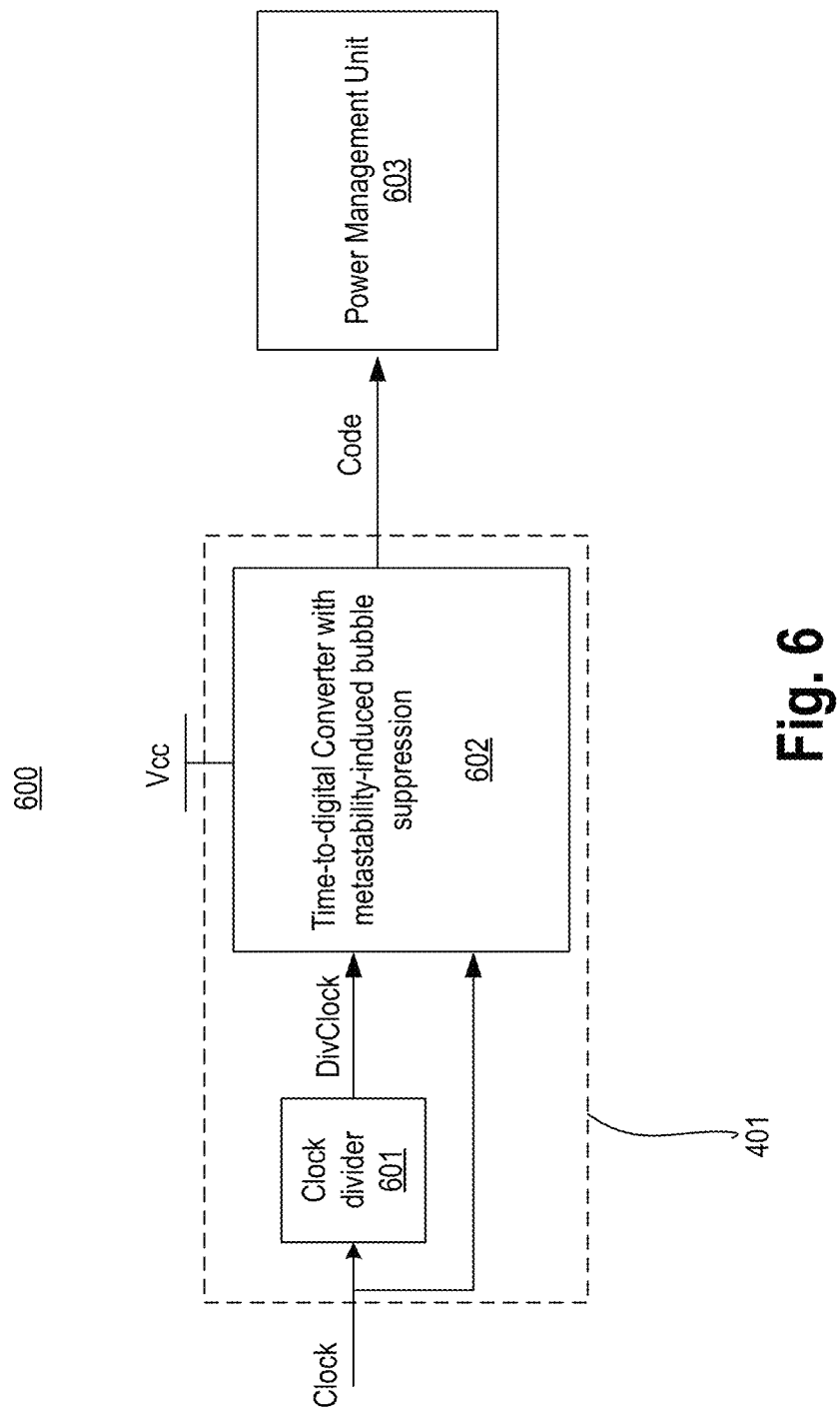
FIG. 6 illustrates a high-level architecture of the ADVM, in accordance with some embodiments.

FIG. 6 illustrates a high-level architecture 600 of the ADVM, in accordance with some embodiments. Architecture 600 of FIG. 6 illustrates ADVM 401, which includes a clock divider 601 and a time-to-digital converter (TDC) 602. In various embodiments, clock divider 601 receives the input clock and generates a frequency-divided clock Div-Clock for TDC 602. Any suitable clock source can generate the input clock. For example, a phase locked loop (PLL), delay locked loop (DLL), frequency locked loop (FLL), ring oscillator, etc., can be used to generate the input clock. TDC 602 is a time digitizer that measures a time interval and converts it into digital (e.g., binary) output Code. In some embodiments, clock divider 601 is a divide-by-two frequency divider. In other embodiments, other divider ratios (e.g., divide-by-4, divide-by-8, etc.) can be used.

In various embodiments, TDC 602 has a latency of one cycle of the input clock. In some embodiments, TDC 602 comprises a delay chain that include delay cells. The delay chain receives the frequency-divided clock DivClk at an input of the delay chain. The delay chain couples to a plurality of sequential circuitries. Each of the sequential circuitries couples to an output of an individual delay cell of the delay chain. A selection circuitry couples with the plurality of sequential circuitries. The selection circuitry includes multiple multiplexers. Each multiplexer couples to an individual sequential circuitry of the plurality of sequential circuitries. In various embodiments, TDC 602 applies polarity inversion of the code every other cycle. Multiple multiplexors controlled by the divided clock DivClk implement polarity inversion of the code every other cycle. In some embodiments, TDC 602 comprises a plurality of logic gates. Each logic gate of the plurality of logic gates has an input coupled to an output of each multiplexer. In some embodiments, each logic gate includes one of an AND gate, NAND gate, or NOR gate. Bubble suppression can use other digital logic gates too. The plurality of logic gates suppresses metastability-induced bubble in the output of the plurality of sequential circuitries. As such, the code is clean from aliasing-based errors.

In some embodiments, TDC 602 couples to a power management unit (PMU) 603. PMU 603 receives the output Code from ADVM 401 and takes appropriate action according to the value of the code. For example, PMU 603 may increase or decrease frequency of a clock of a phase locked loop (PLL), reduce loading conditions (e.g., by postposing or spreading power intensive workloads), etc. In some embodiments, PMU 603 provides the Code to a pin of a processor, accessible by logic outside of the processor. As such, the code can debug various aspects of the processor such as timing errors (e.g., setup/hold timing issues). In some embodiments, PMU 603 (or p-unit) has a hierarchical architecture as described with reference to FIG. 15.

Figure 7:
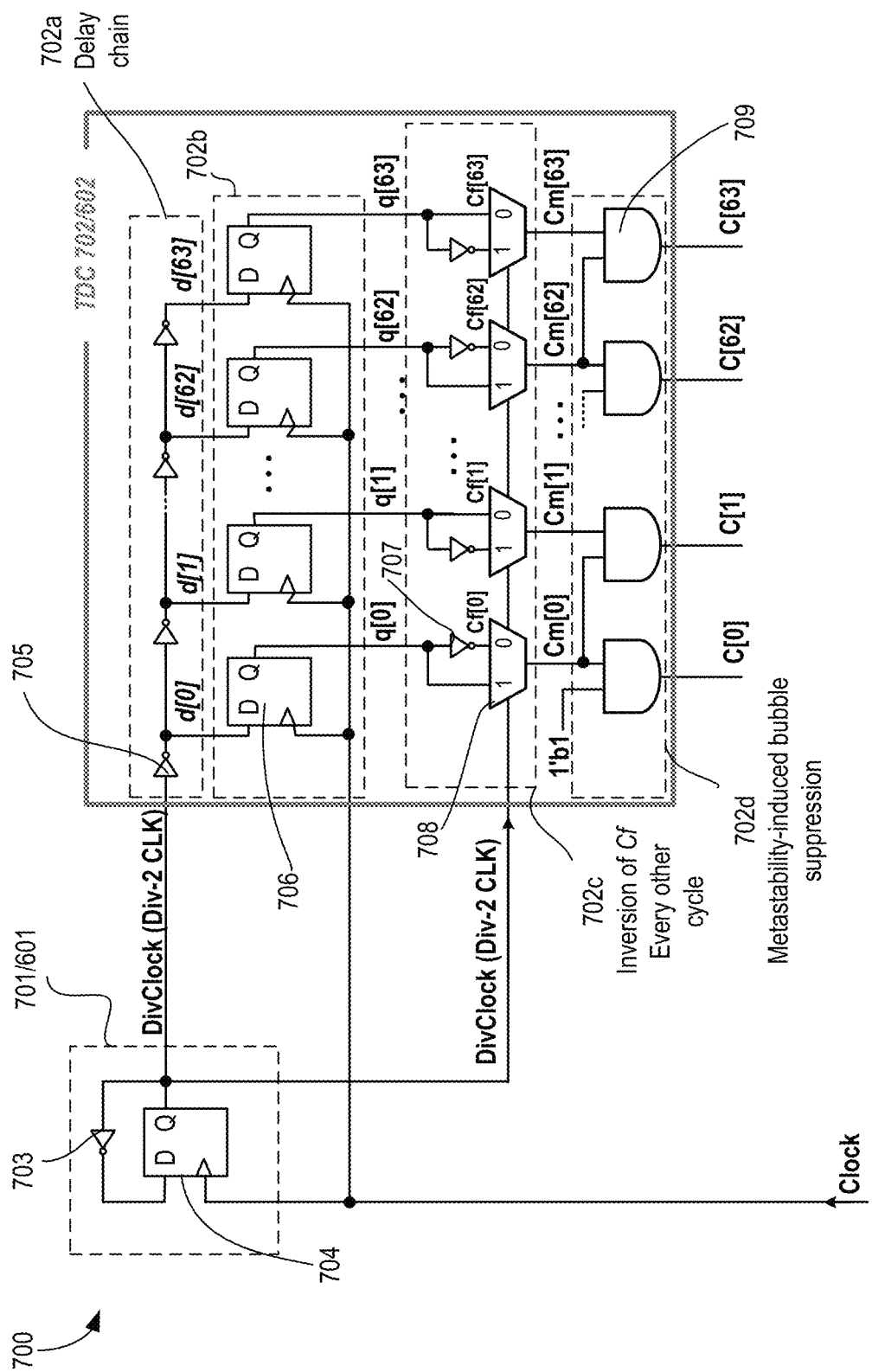
FIG. 7 illustrates a circuit-level implementation of the ADVM, in accordance with some embodiments.

FIG. 7 illustrates a circuit-level implementation of the ADVM, in accordance with some embodiments. In some embodiments, clock divider 701/601 is a divide-by-two divider that includes an inverter 703 and flip-flop (FF) 704. The output (Q) of FF 704 couples to an input of inverter 703, while an output of inverter 703 couples to an input (D) of FF 704. An input clock pin of FF 704 receives a clock, and the output Q of FF 704 is a divide-by-two (Div-2 Clk) on node DivClk. Here, node names and signal names are interchangeably used. For example, DivClk may refer to node DivClk or signal DivClk depending on the context of the sentence.

In some embodiments, TDC 702/602 comprises a delay chain 702a, a plurality of sequential units 702b, a plurality of selection circuitries 702c, and bubble suppression logic 702d. In some embodiments, delay chain 702a comprises a plurality of delay cells 705. The input of the delay chain 702a is the DivClk. In this example, each delay cell is an inversion logic such as inverter 705. Each delay cell couples to a power supply rail Vcc. As such, propagation delay of each delay cell directly relates to the voltage level of power supply rail Vcc. As the voltage level falls, propagation delay of the delay cell increases, and as the voltage level rises, the propagation delay of the delay cell rises. Each delay cell couples in a string. For instance, the output of the first delay cell couples to an input of the next delay cell, and so on. In this example, FIG. 7 shows 64 delay cells. However, any number of delay cells can be used. Inversion delay cells can be any suitable digital or process scalable delay cells. While an inverter is a simplest form of an inversion delay cell, other cells such as NAND gate, NOR gate, inverting multiplexers etc. can be configured and used as inversion delay cells. These inversion delay cells can be standard cells from a standard-cell library.

In various embodiments, plurality of sequential units 702b includes a plurality of flip-flops (FF) 706. Any suitable flip-flop design can be used for implementing FF 706. For example, FF 706 is a master-slave D-FF, a set-reset based FF, a FF with clock gating, a FF with scan capability, etc. The input D of each FF 706 couples to an output of an inverting delay cell. Each FF 706 uses the Clock as the sampling clock, which is slower in frequency than the frequency of the DivClock. For example, sampling clock is twice as slow as the DivClock. An input by a selection circuitry receives an output q of each FF 706 as shown.

Here, 64 FFs 706 are shown that result in 64 outputs q[0], q[1], . . . q[62], and q[63]. Flip-flops 706 sample states of inverters 705 at every rising edge of the domain Clock. For an odd cycle, high-phase of the divided clock (Div-2 CLK) passes through delay chain 702a, and for an even cycle, low-phase of divided clock (Div-2 CLK) passes through delay chain 702a. To generate consistent output codes every domain clock cycle, regardless of the "Div-2 CLK" phase passed to the chain, ADVM 401 uses polarity inversion of the code every other cycle. In some embodiments, simple multiplexors 708 controlled by the divided clock implement polarity inversion of the code every other cycle.

In some embodiments, each selection circuitry of circuitry 702c includes an inversion logic 707 and a multiplexer 708. Inversion logic 707 can be an inverter in its simplest form or may be any other digital inversion logic such as a NAND gate, NOR gate, etc. configured as an inverter. Each multiplexer is controllable by DivClk. For example, when DivClk is high, multiplexer input '1' is provided as output Cm, and when DivClk is low, multiplexer input '0' is provided as output Cm. When delay cells 705 are inversion logic gates, then each multiplexer input '0' and input '1' receives alternating signals. For example, the first multiplexer 708 receives Cf[0] (which is an inversion of q[0]) at its input '0' and q[0] (which is logically equivalent to inversion of Cf[0]) at its input '1', the next multiplexer 708 (e.g., the second multiplexer) receives Cf[1] (which is equivalent to q[1]) at its input '0' and an inversion of q[1] (which is logically equivalent to inversion Cf[1]) at its input '1' and, and so on. DivClock selects Cf[63:0] for Cm[63:0] when it is 0, and inversion of Cf[63:0] when it is 1. Logic gate 709 of the bubble suppression circuitry 702d receives output Cm of each multiplexer. With 702c, the resulting output codes Cm[63:0] become thermometer code. However, any number of multiplexers 708 and 64 inversion logic 707 can be used in accordance with the number of delay cells 705. In general, the number of FF 706, inversion logic gates 707, and multiplexers 708 is equal (or substantially equal) as the number of delay cells 705.

In some embodiments, logic gate 709 is an AND gate. In this case, the first AND gate receives a hard-wired logic '1' value at its first input and Cm[0] at its second input. The next AND gate (e.g., second AND gate) receives Cm[0] at its first input and Cm[1] at its second input, and so on. As such, any flip-flop metastability-induced bubble in the code Cm[0] thorough Cm[63], is suppressed by bubble suppression logic gates 709. While AND gates are illustrated for logic gates 709, these AND gates can be implemented as NAND gates. In this case, 64 AND gate are shown, which is the same number of delay cells 705. The output C of each AND gate together form a bus (e.g., a 64-bit code).

The delay-based voltage monitor 401 of various embodiments applies all-digital standard cells. Therefore, its layout is easily made with industry-standard APR tool(s) without manual design efforts of layout designers. ADVM 700 has fast response time of one cycle latency by passing a "Div-2 CLK" every cycle and inverting polarity of the intermediate code (e.g., Cf[63:0]) every other clock cycle. ADVM 700 is accurate by sampling Vcc for a full cycle, offering improved droop detection resolution. ADVM 700 also has comprehensive HVM (high volume manufacturing) characterization flow, which makes it process-agnostic, and IP-agnostic, enabling rapid development for technology process nodes. While the embodiments are described with reference to 64-bit code that uses 64 AND gates and other logic, the embodiments are not limited to a particular code size. For example, 26, 32, 128, etc. code size can be used that also changes the number of logic gates for ADVM 700.

Figure 8:
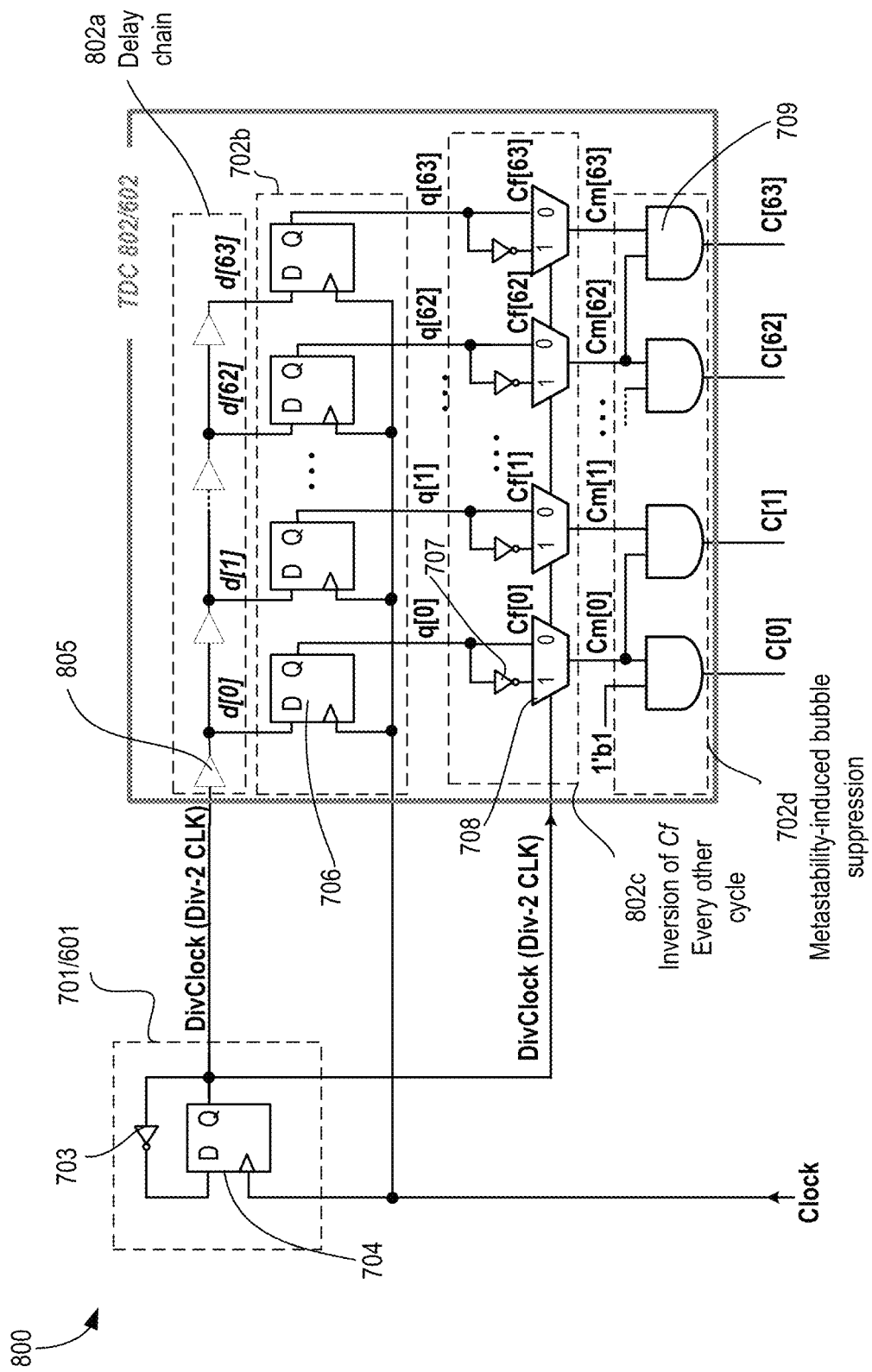
FIG. 8 illustrates a circuit-level implementation of the ADVM, in accordance with some embodiments.

FIG. 8 illustrates a circuit-level implementation 800 of the ADVM, in accordance with some embodiments. ADVM 800 is similar to ADVM 700 but for a different implementation of delay chain 802a and selection circuitry 802c. In some embodiments, inversion delay cells 705 are replaced with non-inversion delay cells 805. Such non-inversion delay cells 805 include buffers, AND gates, OR gates etc. In this example, non-inversion delay cells 805 are illustrated as buffers. By using buffers 805, the inputs of multiplexer 708 are not alternated as described with reference to FIG. 7. For example, first multiplexer 708 receives Cf[0] (which is equivalent to q[0]) at its input '0' and an inversion of q[0] (which is logically equivalent to inversion Cf[0]) at its input '1', the next multiplexer 708 (e.g., the second multiplexer) also receives Cf[1] (which is equivalent to q[1]) at its input '0' and an inversion of q[1] (which is logically equivalent to inversion Cf[1]) at its input '1', and so on. Technical effect wise, ADVM 800 is similar to ADVM 700.

Figure 9:
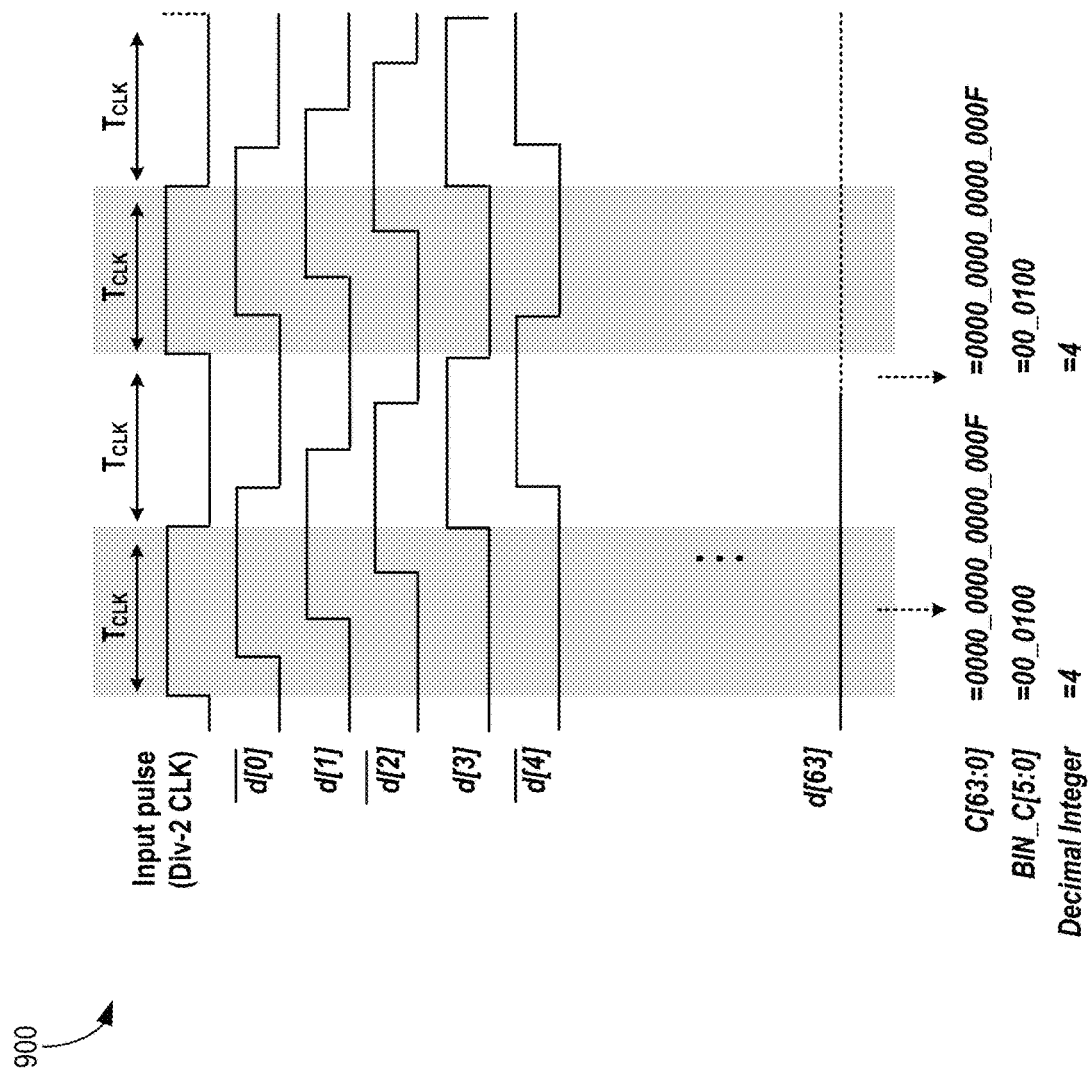
FIG. 9 illustrates a plot showing a timing-diagram of the ADVM, in accordance with some embodiments.

FIG. 9 illustrates plot 900 showing a timing-diagram of the ADVM, in accordance with some embodiments. Plot 900 shows data from each delay cell of delay chain 702a. In this case, the delay cell is an inverter, and the bar over d[0] indicates an inversion of d[0]. Regardless of input pulse phase fed into the ADVM, its output code C[63:0] is consistent. In the example, C[63:0] =0000_0000_0000_000F, which can be encoded into binary code BIN_C[5:0]=00_0100, corresponding to decimal integer of 4.

Figure 10:
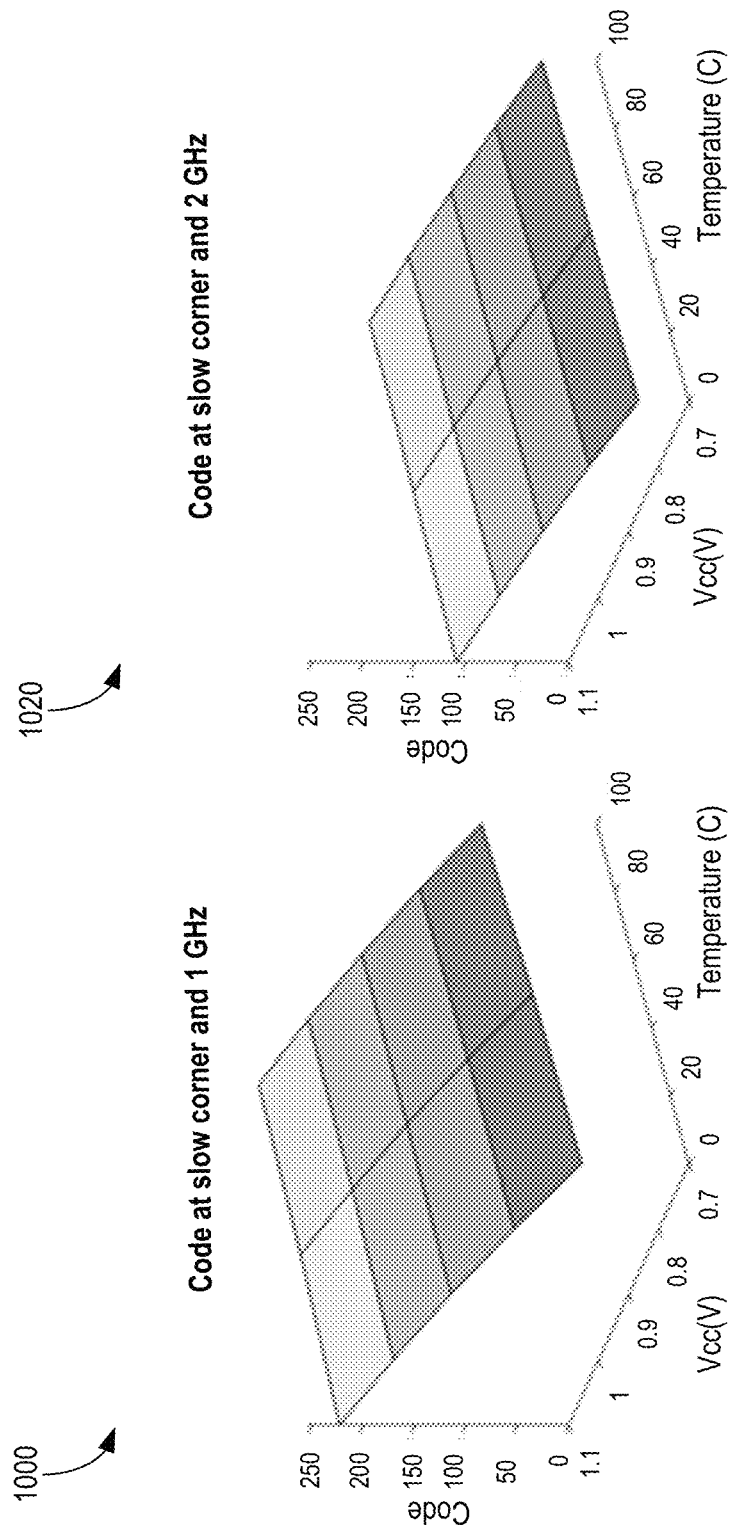
FIGS. 10A-B illustrate plots showing ADVM code changes across Vcc and temperature and different clock frequencies, in accordance with some embodiments.

FIGS. 10A-B illustrate plots 1000 and 1020, respectively, showing ADVM code changes across Vcc and temperature and different clock frequencies, in accordance with some embodiments. In some embodiments, the HVM characterization flow is used because ADVM code is sensitive to slow variation due to die process corner (P), current operating voltage (Vcc) including any added voltage guard band, current operating clock frequency (F) where AVDM sampling clock period $T_{CLK}=1/F$, and current temperature (T). FIGS. 10A-B show an example of how ADVM code changes across Vcc and temperature, at a given process corner (e.g., slow corner), and at two frequencies of 1 GHz and 2 GHz, respectively.

Since a given IP block goes through various operating conditions during actual use, one ADVM characterization point may not be enough to compensate for the impact of PVT and F variations on ADVM output code. As a solution, in some embodiments, the HVM characterization flow of ADVM 401 comprises the following two operations. The first operation characterizes ADVM code per die (P during test) while the second operation, during actual use of ADVM 401, leverages existing PMU of the given IP block to continuously compute the impact of new V, T, F operating point on ADVM code.

In some embodiments, for the first operation, ADVM code is characterized per die (P) during test at M voltage points (V), two temperature points (T) (e.g., hot and code temperatures), and two frequency points (F). The sampled ADVM code are stored in on-die fuses or other non-volatile memory. For example, ADVM codes are stored in (M×2× 2)×log$_2$ (ADVM-chain-length). The ADVM chain length is 64 in FIGS. 7-8.

Referring back to FIGS. 10A-B, for the second operation, during actual use, to leverage exiting power management unit of the given IP, a log continuously computes the impact of a new V, T, F operating point on ADVM code. For example, in approx. 100's of microseconds T changes are captured. In another example, the log continuously computes the impact of a new V, T, F instantly whenever either of V or F changes is executed. In some embodiments, the impact of a new V, T, F operating point on ADVM code is computed through tri-linear interpolation with respect to V, T, and 1/F (where, 1/F is a clock period) based on measured or stored codes from the first operation in the flow.

With the above 2-step flow, any critical decision based on current AVDM code (e.g., kicking off some droop mitigation action) is correctly executed despite variations in P, V, T, and F. Simulation shows that corrected AVDM code with the scheme of various embodiments gives a Vcc monitoring error (e.g., less than 7 mV) across a very wide range of P, V, T, and F.

Figure 11:
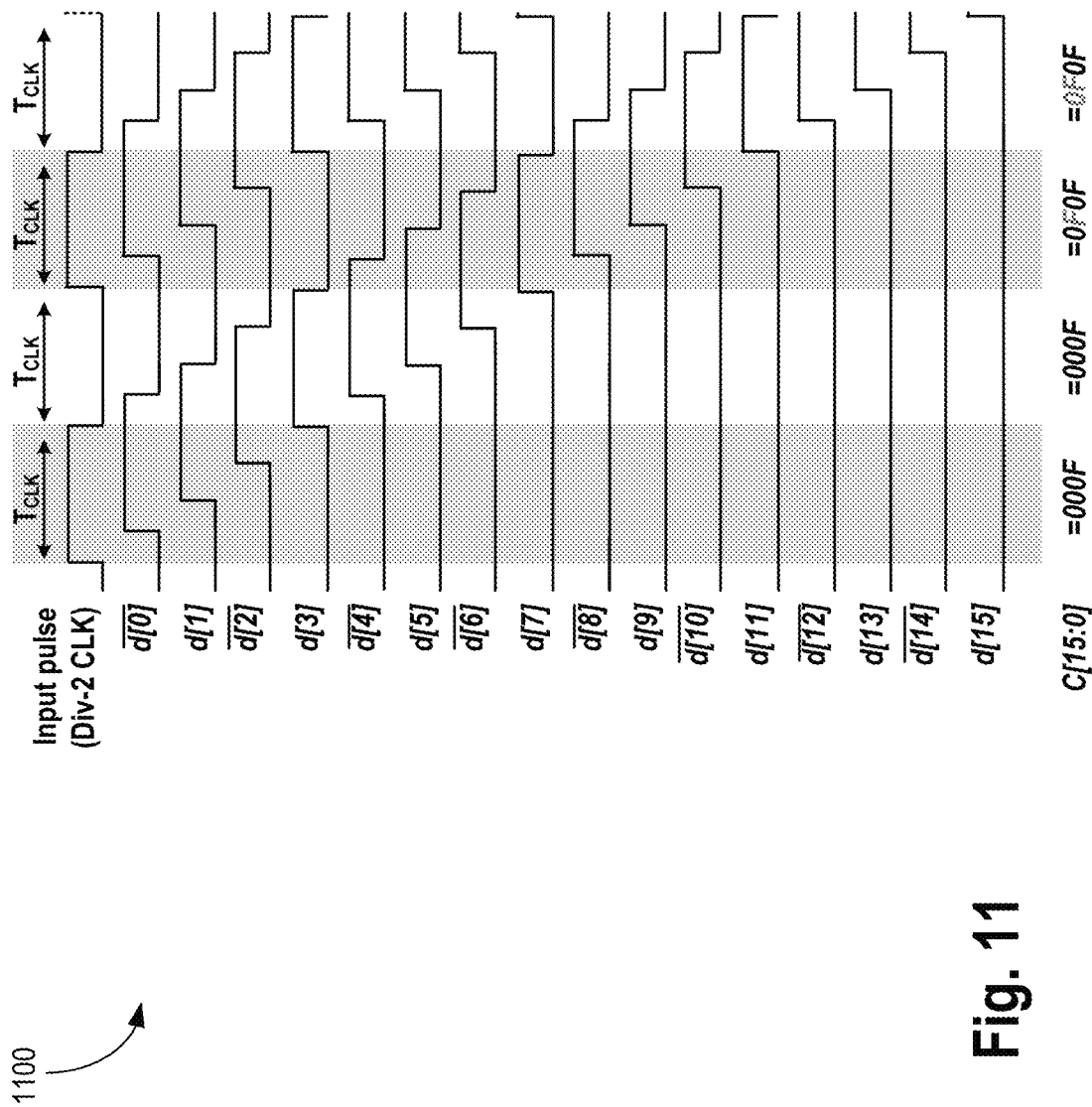
FIG. 11 illustrates a plot showing waveforms of ADVM delay chain inverter states that result in aliasing-code in a thermometer code format, in accordance with some embodiments.

FIG. 11 illustrates plot 1100 showing waveforms of ADVM delay chain inverter states that result in aliasing-code in a thermometer code format, in accordance with some embodiments. In the absence of logic 702*d*, as discussed herein, ADVM can suffer from code aliasing because it does not have a dedicated reset phase, and instead, pulses of the divided clock DivClock keep propagating through the delay chain, resulting in pulses of previous clock cycles affecting a current output code. It is manifested with long delay chain, and extreme conditions of slow P, low V, low T, and fast F, that leads to satisfying the aliasing condition that 2×T$_{CLK}$ become smaller than total delay across the delay chain. On the other hand, under an extreme condition of fast P, high V, high T, and slow F, a code saturation can happen when using a short delay chain and operating that leads to satisfying the saturation condition that T$_{CLK}$ become larger than total delay across delay chain 702*a* (or 802*a*). Both code aliasing and saturation are exaggerated with the elimination of tunable gate delay in ADVM.

Plot 1100 shows how 16-bit ADVM output code ends up with aliasing. Assuming the voltage state does not state over 4 consecutive cycles, the first two captured code are 000F as desired, but the next two codes becomes 0F0F, and the MSB (most significant bit) 0F is due to the previous pulse that was still propagating through the chain.

To deal with the conflicting aliasing and saturation conditions, one approach is to use the minimum delay chain length (e.g. 128*b* or 256*b*) needed to prevent saturation under worst-case (saturation) operating condition for the given IP block, and then detect and correct for aliasing when it happens.

The following embodiments describe three different schemes to detect and correct for ADVM code aliasing.

In the first method or scheme, the aliasing code issue is resolved by generating and fusing an aliasing-masking-code during HVM characterization phase, and providing the aliasing-masking-code to ADVM 401 to filter out the aliasing-code by performing bit-wise AND operation between the raw output code and the masking-code. For the example in plot 1100, where Original-CODE [15:0]=0x0F0F (where 0x indicates hexadecimal number representation, and most significant "0F" is the result of aliasing), Masking-CODE [15:0]=0x00FF is generated under worst-case condition, and Filtered-CODE [15:0] is made equal to Original-CODE "&" Masking-CODE=000F, where "&" indicates bit-wise and operation.

In the second method or scheme, the solution to correct aliasing code issue may not use additional manufacturing efforts, and utilizes parallel thermometer-to-binary-code encoders. These parallel thermometer-to-binary-code encodes encode the least significant $2^K-1$ bits of the thermometer codes to K-bit binary codes, where K can take the values E, E+1, E+N−1, for N>1, by summing all the individual bits of a thermometer code to encode into a binary code. Then, by examining each of the K-bit binary codes (where K=E, E+1, ..., E+N−1, and N>1), a fast code-post-processing Aliasing Correction Logic (ACL) decides whether there exists an aliased code, and which K-bit binary code should be taken for voltage monitoring. The ACL examines all the binary codes, and finds saturated binary codes. If K-bit binary codes, where E≤K≤S, are all saturated, and if E≤S<E+N−1, then the ACL takes (S+1)-bit binary code for voltage monitoring code. If S=E+N−1, then the ACL takes S-bit binary code, and it sends "emergency" warning to PMU 603 to indicate code saturation.

In an example of 32*b* code, where C[31:0] =0x000F_FFFF, three binary-code encoders are used with E=3, and N=3, to respectively encode the least significant 8-bit, 16-bit, and 32-bit of the thermometer codes to 3-bit, 4-bit, and 5-bit binary code. The three encoded binary codes are respectively, 111$_2$ (=7), 1111$_2$ (=15), and 1_0100$_2$ (=20). The ACL examines the binary outputs of 111$_2$, and 1111$_2$, and informs that they are saturated (S=4), so it takes the 5-bit binary code as voltage monitoring code. Similarly, when C[31:0]=0xFF00_0FFF, the code has aliasing of "FF" in the most-significant bits (MSBs), and the ACL filters out the aliasing-code "FF", the encoders generate 111$_2$ (=3), 1100$_2$ (=12), and the ACL examines them. In this case, merely the 3-bit binary code of 111$_2$ is saturated, so the ACL takes the 4-bit binary code of 1100$_2$ for voltage monitoring code, ignoring the 5-bit binary code, and filtering out the aliasing-code.

In the third method or scheme, the solution to correct aliasing may not use additional manufacturing efforts unlike the first method, and uses multiple parallel encoders like in the second method albeit uniform size. In this method, to process $2^K-1$ bits of the thermometer codes (e.g. T[($2^K-2$): 0]) to K-bit binary codes, the scheme utilizes P units of parallel thermometer-to-binary-code encoders that each encodes 2E thermometer codes to (E+1)-bit binary codes, where K=E+P. If each of the encoders encodes a non-overlapping and continuous $2^E$-bit segment (where a segment can be T[$2^E-1$:0], T[($2 \times 2^E-1$):$2^E$], ..., T[($2^K-2$):(P−1)×$2^E$]) from the original thermometer code (e.g. T[($2^K-2$): 0]), then a fast post-processing ACL can decide whether there exists an aliased code, and generates a final binary code.

If the outputs of all of the Q encoders that encode the lower Q×$2^E$-bit of the thermometer code (e.g. T[(Q×$2^E-1$): 0]) are saturated, and if Q is not equal to P, the ACL sums outputs from the Q encoder to generate final K-bit code. If Q is equal to P, then the ACL generates $2^K-1$ (or saturation) in the final binary code, and it sends "emergency" warning to PMU 303. For example, for 127-bit thermometer CODE [126:0] =0x0600_0000_0000_0000_FFFF_FFFF_FFFF_FFFF, four 6-bit binary codes are used for CODE [126:96], CODE [95:64], CODE [63:32], CODE [31:0], respectively. Then, the 6-bit binary encoded outputs are respectively 2, 0, 32, and 32. By having the ACL detect that CODE [63:32] and CODE [31:0] are saturated, and CODE [95:64] is not, the final binary code as 0+32+32=64 is generated correctly.

The following is a design flow for ADVM 401. First, replace standard cells in a reference ADVM design with target library standard cells. Second, perform functionality check with SPICE simulation. Third, convert schematic to Verilog or any other hardware description language. Four, perform APR with parametrized script for symmetric dedicated placement of delay cells, and other gates in equidistance. Five, perform synthesis and/or APR of code post-processing units such as thermometer-to-binary-code encoder with aliasing correction logic.

Figure 12:
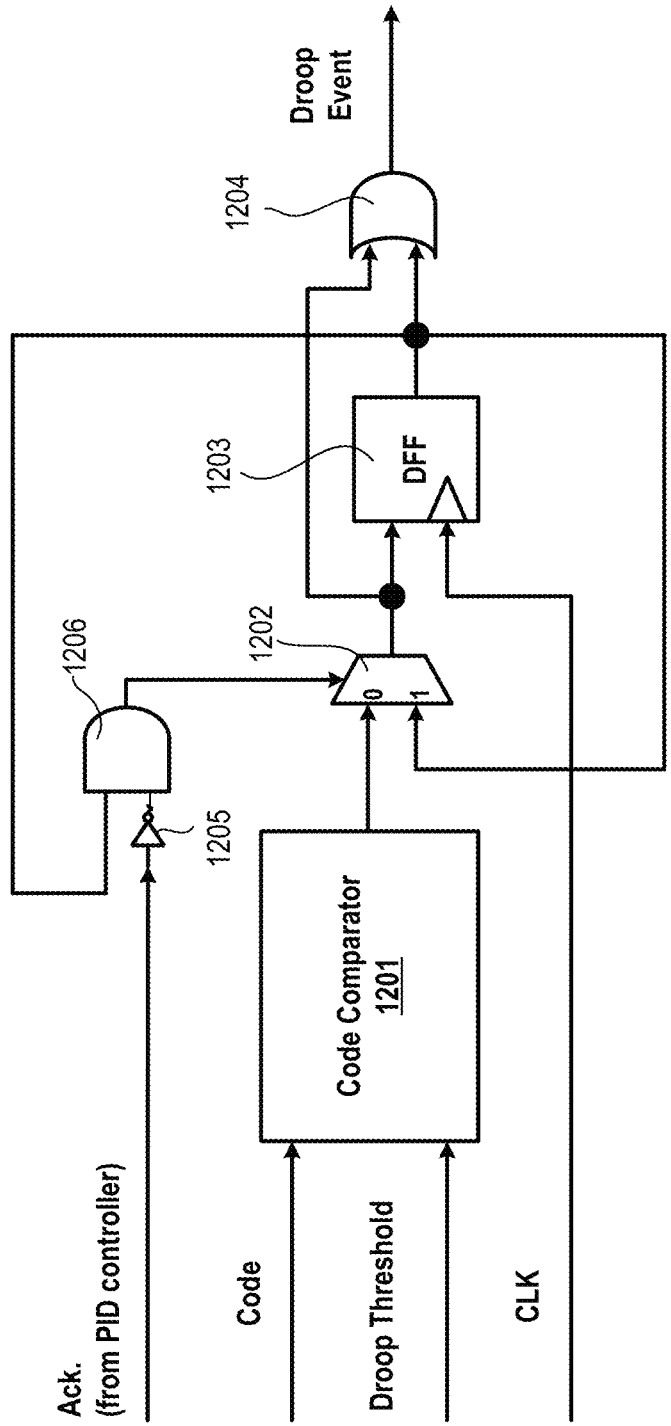
FIG. 12 illustrates a schematic of the fast droop detector, in accordance with some embodiments.

FIG. 12 illustrates a schematic of the fast droop detector 1200 (e.g., 203), in accordance with some embodiments. As discussed herein, the PID gain parameters should be set to guarantee overall D-DLDO stability under wide operating conditions while also providing fast response to transients. To improve droop response and decouple that from steady-state stability constraint, fast droop detection and response are added. In some embodiments, fast droop detector 1200 is clocked at the IP clock frequency for fastest response time. This is unlike the PID controller with operating frequency that can be slower than the IP clock as determined by factor like D-DLDO stability, D-DLDO quiescent current, and controller logic depth. In some embodiments, fast droop detector 1200, on the other hand, is a small block with shallow logic depth, allowing it to operate at the IP clock frequency for fastest droop response, and with only small power penalty.

In some embodiments, fast droop detector 1200 comprises code comparator 1201, multiplexer 1202, data sequential logic or flip-flop (DFF) 1203, OR gate 1204, inverter 1205, and AND gate 1206 coupled as shown. A droop is detected by checking by code comparator 1201 if the ADVM digital code is smaller than a pre-set droop threshold code, and if that is true, the detector immediately notifies PID controller 202 of a "droop event". The immediate notification is generated by OR gate 1204 that ORs the output of code comparator 1201 with the output of DFF 1203. Note, multiplexer 1202 passes the output of code comparator 1201 to OR gate 1204 unless an acknowledgement signal is received by PID controller 202.

PID controller 202 in turn asynchronously enables a preset "max" number of PGs 201 and simultaneously sets "max" the "I" accumulator to the same "max" so that once "droop event" is de-asserted, PID controller 202 can continue normal PID control to dial down PG strength starting from the "max" value for stable operation. Note that the "droop event" signal is kept asserted by droop detector 1200 until it receives an acknowledgement signal, "Ack", from PID controller 202 as the latter can run at slower clock frequency. The Ack signal is inverted by inverter 1205 and ANDed by AND gate 1206 with the output of DFF 1203. The output of AND gate 1206 controls multiplexer 1202 and selects the output of DFF 1203 when Ack is received. Otherwise, DFF 1203 samples the output of code comparator 1201.

Figure 13:
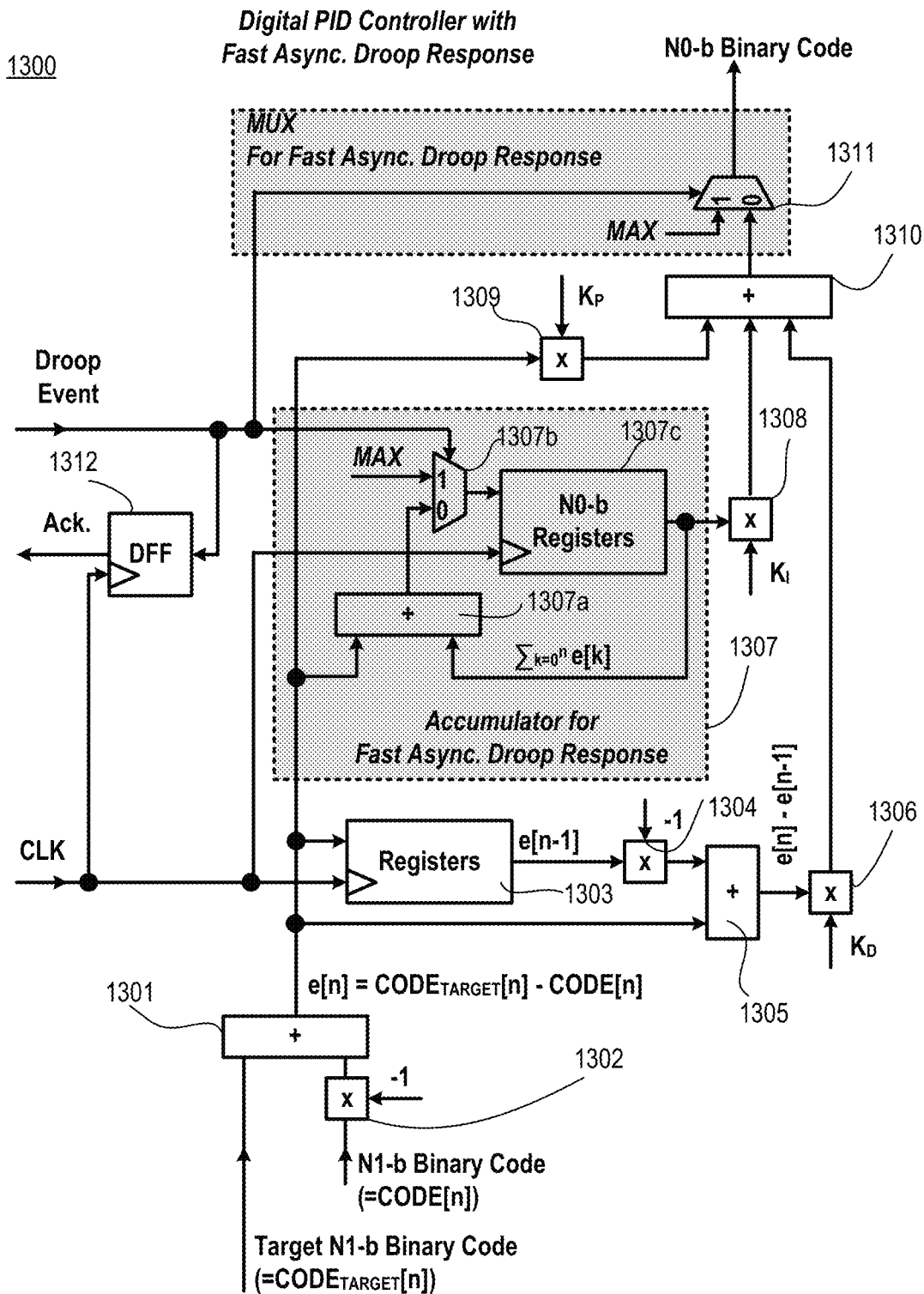
FIG. 13 illustrates a schematic of the digital PID controller with fast asynchronous droop response capability, in accordance with some embodiments.

FIG. 13 illustrates a schematic of digital PID controller 1300 (e.g., 202) with fast asynchronous droop response capability, in accordance with some embodiments. In some embodiments, digital PID controller 1300 comprises adder 1301, multiplier 1302, registers 1303, multiplier 1304, adder 1305, multiplier 1306, accumulator 1307, multiplier 1308, multiplier 1309, adder 1310, multiplexer 1311, and flip-flop 1312 coupled as shown. In some embodiments, accumulator 1307 comprises adder 1307a, multiplexer 1307b, and registers 1307c.

PID controller 1300 asynchronously enables a preset "max" number of PGs 201 and simultaneously sets the "I" accumulator 1307 to the same "max" so that once "droop event" is de-asserted, PID controller 1300 can continue normal PID control to dial down PG 101 strength starting from the "max" value for stable operation. Note that the "droop event" signal is kept asserted by droop detector 1200 until it receives an acknowledgement signal, "Ack", from the PID controller as the latter can run at slower clock frequency.

The PID controller output, N0-b binary output is set $K_P \times e[n] + K_I \times \Sigma e[n] + K_D \times (e[n]-e[n-1])$, to set strength of PG gates 201, by using digital circuits. Here $K_P$=proportional (P) gain, $K_I$=integral (I) gain, $K_D$=derivative (D) gain, $e[n]$=CODE$_{TARGET}$−CODE$_{OUT}[n]$, CODE$_{TARGET}$ is the ADVM digital code corresponding to $V_{TARGET}$, and CODE$_{OUT}[n]$ is the ADVM code representing $V_{OUT}[n]$, at time=n× $T_{CLK}$, where $T_{CLK}$=ADVM clock period. For asynchronous and stable droop response upon droop event, multiplexor 1311 with "max" at one input setting maximum strength of PG gates 201 is utilized at the output of PID controller 1300, as well as at the input of N0-b Registers 1307c in the Accumulator 1307, which determines $\Sigma e[n]$.

Figure 14:
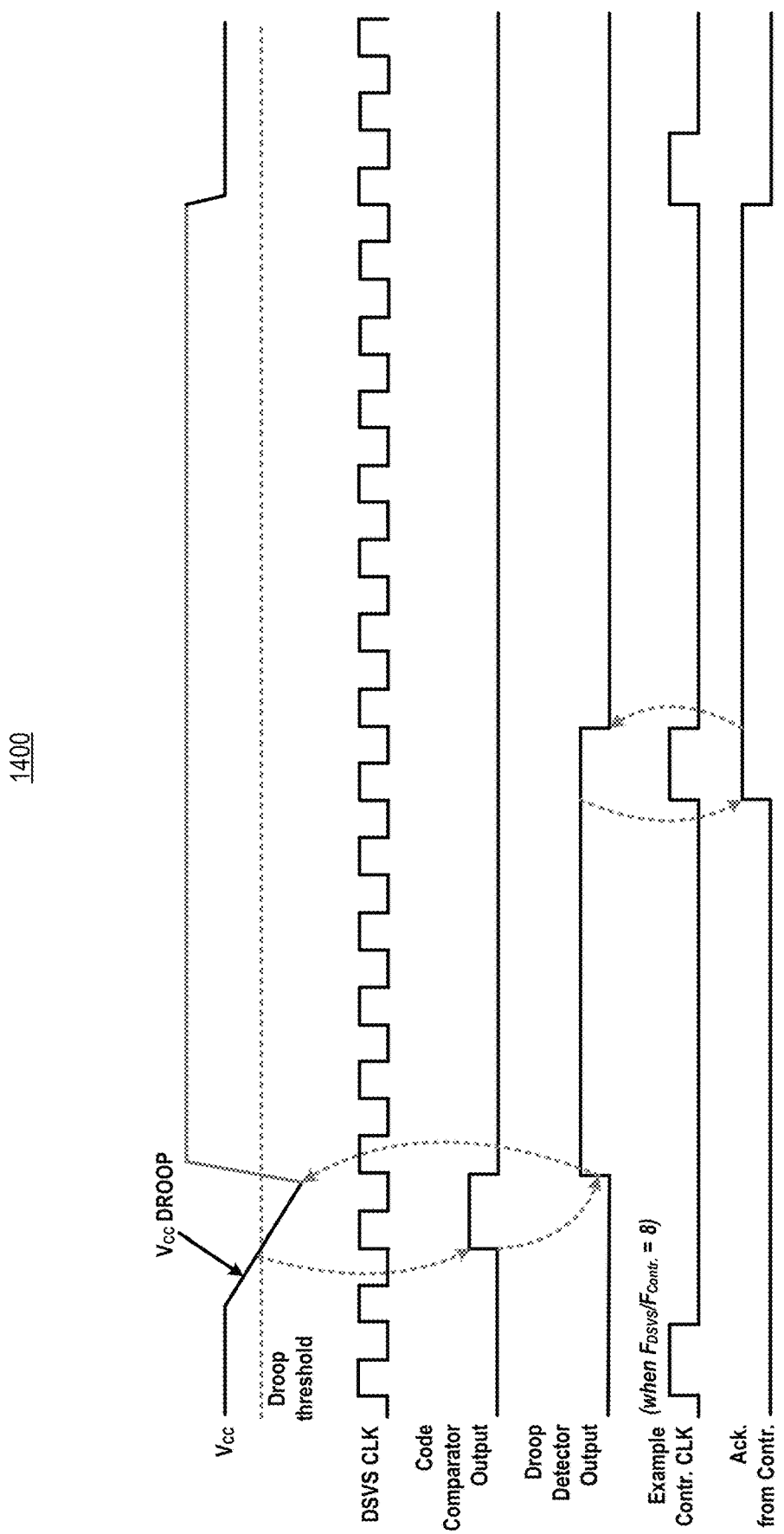
FIG. 14 illustrates a timing diagram with voltage change, and handshaking operation between droop detector output and controller acknowledgement signal, in accordance with some embodiments.

FIG. 14 illustrates timing diagram 1400 with voltage change, and handshaking operation between droop detector 1200 output and controller 1300 acknowledgement (Ack.) signal, in accordance with some embodiments. Timing diagram 1400 shows that the droop mitigation responds to a droop in a single (IP clock) cycle, while ensuring stable operation of PID-controller 1300 through proper handshaking with droop detector 1200. $V_{CC}$ is used to refer to a supply voltage of load circuits (e.g. microprocessor, graphics core, etc.), and $V_{OUT}$ is labelled as an output voltage of DLDO and D-DLDO. $V_{CC}$ and $V_{OUT}$ are the same node.

D-DLDO 101 can be implemented using an APR-friendly design flow as follows. One, import a reference ADVM into the target technology process. Two, determine load current range (=$I_{MIN}$–$I_{MAX}$) from target load circuits domain across PVT (process, voltage, and temperature) corners. Three, set the number of DLDO units (=$N_{DLDO}$) in D-DLDO. Fourth, set target load current range of DLDO units (=$I_{MIN}/N_{DLDO}$~$I_{MAX}/N_{DLDO}$) at target voltage range. Five, simulate drain current (=$I_{PG,D}$) of digital standard library PG cell for a target range of $V_{IN}$, and $V_{OUT}$ across PVT corners. Six, estimate the number of PG cell instances (=$I_{MAX}/(N_{DLDO} \times I_{PG,D})$) per DLDO unit at target voltage range. Seven, perform APR of PG-block with the target number of PG instances. Eight, perform post-APR analysis for extracted-RC, and check resistance of metal Via stacks on top of the PG-block to determine whether to add more metal Vias, and/or more PG instances to reduce IR drop. Nine, import a reference PID controller in RTL Verilog, and properly change its input bit-width (e.g., coming from ADVM) as well as its output bit-width (feeding the PG-block). Ten, perform logic-synthesis and APR of the controller. Eleven, import a reference fast droop detector, and perform logic-synthesis and APR. Twelve, integrate ADVM, PG-block, PID controller, fast droop detector to complete design of DLDO unit. Eleven, instantiate as many DLDO units as necessary in floorplan stage of top-level IP block integration.

In some embodiments, dead-band is implemented with at least two comparators. The first comparator compares a first reference code with a code from the ADVM. The first comparator compares a second reference code with the code from the ADVM. The first reference code is higher (or large value) than the second reference code. In some embodiments, the first reference code is higher than CODE$_{TARGET}$ and the second reference code is lower than the $\text{CODE}_{TARGET}$. The output of the first and/or second comparators informs whether the code is in the dead band. In that case, the PID controller is halted, in some embodiments. When the ADVM code is higher than first reference code or lower than second reference code, then the outputs of the first and/or second compactors cause the PID controller to continue its normal operation, in accordance with some embodiments.

Figure 15:
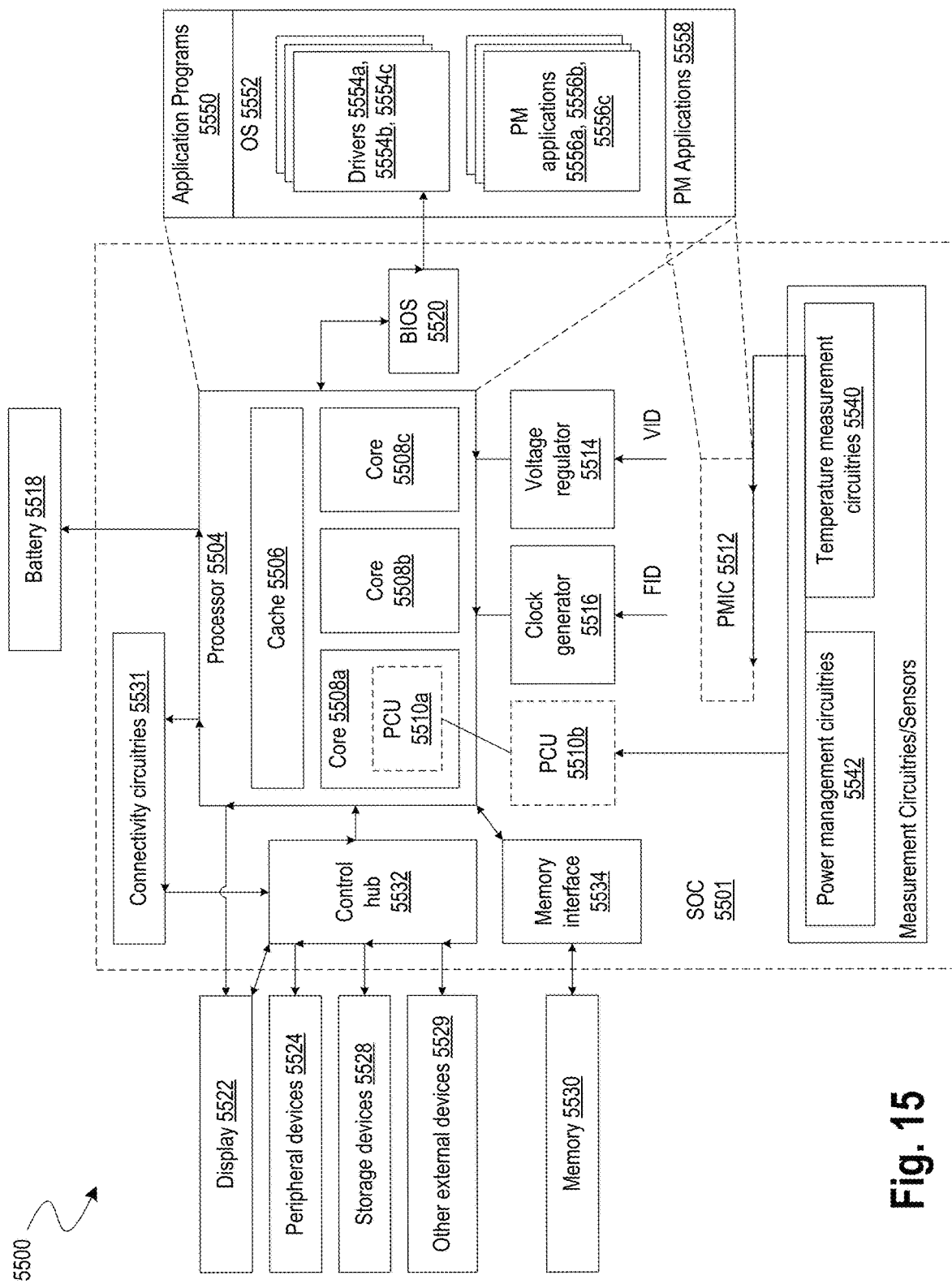
FIG. 15 illustrates a smart device or a computer system or a SoC (System-on-Chip) with the distributed D-LDO, in accordance with some embodiments.

FIG. 15 illustrates a smart device or a computer system or a SoC (System-on-Chip) with the distributed D-LDO, in accordance with some embodiments. Any of the blocks herein can have the distributed and scalable All-Digital Low Dropout Integrated Voltage Regulator in accordance with various embodiments. It is pointed out that those elements of FIG. 15 having the same reference numbers (or names) as the elements of any other figure may operate or function in any manner similar to that described, but are not limited to such. Any block in this smart device can have the apparatus for dynamically optimizing battery charging voltage.

In some embodiments, device 5500 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 5500.

In an example, the device 5500 comprises an SoC (System-on-Chip) 5501. An example boundary of the SoC 5501 is illustrated using dotted lines in FIG. 15, with some example components being illustrated to be included within SoC 5501—however, SoC 5501 may include any appropriate components of device 5500.

In some embodiments, device 5500 includes processor 5504. Processor 5504 can include one or more physical devices, such as microprocessors, application processors, microcontrollers, programmable logic devices, processing cores, or other processing implementations such as disaggregated combinations of multiple compute, graphics, accelerator, I/O and/or other processing chips. The processing operations performed by processor 5504 include the execution of an operating platform or operating system on which applications and/or device functions are executed. The processing operations include operations related to I/O (input/output) with a human user or with other devices, operations related to power management, operations related to connecting computing device 5500 to another device, and/or the like. The processing operations may also include operations related to audio I/O and/or display I/O.

In some embodiments, processor 5504 includes multiple processing cores (also referred to as cores) 5508a, 5508b, 5508c. Although merely three cores 5508a, 5508b, 5508c are illustrated in FIG. 15, processor 5504 may include any other appropriate number of processing cores, e.g., tens, or even hundreds of processing cores. Processor cores 5508a, 5508b, 5508c may be implemented on a single integrated circuit (IC) chip. Moreover, the chip may include one or more shared and/or private caches, buses or interconnections, graphics and/or memory controllers, or other components.

In some embodiments, processor 5504 includes cache 5506. In an example, sections of cache 5506 may be dedicated to individual cores 5508 (e.g., a first section of cache 5506 dedicated to core 5508a, a second section of cache 5506 dedicated to core 5508b, and so on). In an example, one or more sections of cache 5506 may be shared among two or more of cores 5508. Cache 5506 may be split in different levels, e.g., level 1 (L1) cache, level 2 (L2) cache, level 3 (L3) cache, etc.

In some embodiments, processor core 5504 may include a fetch unit to fetch instructions (including instructions with conditional branches) for execution by the core 5504. The instructions may be fetched from any storage devices such as the memory 5530. Processor core 5504 may also include a decode unit to decode the fetched instruction. For example, the decode unit may decode the fetched instruction into a plurality of micro-operations. Processor core 5504 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 5504 may be an out-of-order processor core in one embodiment. Processor core 5504 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 5504 may also include a bus unit to enable communication between components of processor core 5504 and other components via one or more buses. Processor core 5504 may also include one or more registers to store data accessed by various components of the core 5504 (such as values related to assigned app priorities and/or sub-system states (modes) association.

In some embodiments, device 5500 comprises connectivity circuitries 5531. For example, connectivity circuitries 5531 includes hardware devices (e.g., wireless and/or wired connectors and communication hardware) and/or software components (e.g., drivers, protocol stacks), e.g., to enable device 5500 to communicate with external devices. Device 5500 may be separate from the external devices, such as other computing devices, wireless access points or base stations, etc.

In an example, connectivity circuitries 5531 may include multiple different types of connectivity. To generalize, the connectivity circuitries 5531 may include cellular connectivity circuitries, wireless connectivity circuitries, etc. Cellular connectivity circuitries of connectivity circuitries 5531 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS)

system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 5531 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 5531 may include a network interface, such as a wired or wireless interface, e.g., so that a system embodiment may be incorporated into a wireless device, for example, a cell phone or personal digital assistant.

In some embodiments, device 5500 comprises control hub 5532, which represents hardware devices and/or software components related to interaction with one or more I/O devices. For example, processor 5504 may communicate with one or more of display 5522, one or more peripheral devices 5524, storage devices 5528, one or more other external devices 5529, etc., via control hub 5532. Control hub 5532 may be a chipset, a Platform Control Hub (PCH), and/or the like.

For example, control hub 5532 illustrates one or more connection points for additional devices that connect to device 5500, e.g., through which a user might interact with the system. For example, devices (e.g., devices 5529) that can be attached to device 5500 include microphone devices, speaker or stereo systems, audio devices, video systems or other display devices, keyboard or keypad devices, or other I/O devices for use with specific applications such as card readers or other devices.

As mentioned above, control hub 5532 can interact with audio devices, display 5522, etc. For example, input through a microphone or other audio device can provide input or commands for one or more applications or functions of device 5500. Additionally, audio output can be provided instead of, or in addition to display output. In another example, if display 5522 includes a touch screen, display 5522 also acts as an input device, which can be at least partially managed by control hub 5532. There can also be additional buttons or switches on computing device 5500 to provide I/O functions managed by control hub 5532. In one embodiment, control hub 5532 manages devices such as accelerometers, cameras, light sensors or other environmental sensors, or other hardware that can be included in device 5500. The input can be part of direct user interaction, as well as providing environmental input to the system to influence its operations (such as filtering for noise, adjusting displays for brightness detection, applying a flash for a camera, or other features).

In some embodiments, control hub 5532 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 5522 represents hardware (e.g., display devices) and software (e.g., drivers) components that provide a visual and/or tactile display for a user to interact with device 5500. Display 5522 may include a display interface, a display screen, and/or hardware device used to provide a display to a user. In some embodiments, display 5522 includes a touch screen (or touch pad) device that provides both output and input to a user. In an example, display 5522 may communicate directly with the processor 5504. Display 5522 can be one or more of an internal display device, as in a mobile electronic device or a laptop device or an external display device attached via a display interface (e.g., DisplayPort, etc.). In one embodiment display 5522 can be a head mounted display (HMD) such as a stereoscopic display device for use in virtual reality (VR) applications or augmented reality (AR) applications.

In some embodiments, and although not illustrated in the figure, in addition to (or instead of) processor 5504, device 5500 may include Graphics Processing Unit (GPU) comprising one or more graphics processing cores, which may control one or more aspects of displaying contents on display 5522.

Control hub 5532 (or platform controller hub) may include hardware interfaces and connectors, as well as software components (e.g., drivers, protocol stacks) to make peripheral connections, e.g., to peripheral devices 5524.

It will be understood that device 5500 could both be a peripheral device to other computing devices, as well as have peripheral devices connected to it. Device 5500 may have a "docking" connector to connect to other computing devices for purposes such as managing (e.g., downloading and/or uploading, changing, synchronizing) content on device 5500. Additionally, a docking connector can allow device 5500 to connect to certain peripherals that allow computing device 5500 to control content output, for example, to audiovisual or other systems.

In addition to a proprietary docking connector or other proprietary connection hardware, device 5500 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 5531 may be coupled to control hub 5532, e.g., in addition to, or instead of, being coupled directly to the processor 5504. In some embodiments, display 5522 may be coupled to control hub 5532, e.g., in addition to, or instead of, being coupled directly to processor 5504.

In some embodiments, device 5500 comprises memory 5530 coupled to processor 5504 via memory interface 5534. Memory 5530 includes memory devices for storing information in device 5500.

In some embodiments, memory 5530 includes apparatus to maintain stable clocking as described with reference to various embodiments. Memory can include nonvolatile (state does not change if power to the memory device is interrupted) and/or volatile (state is indeterminate if power to the memory device is interrupted) memory devices. Memory device 5530 can be a dynamic random-access memory (DRAM) device, a static random-access memory (SRAM) device, flash memory device, phase-change memory device, or some other memory device having suitable performance to serve as process memory. In one embodiment, memory 5530 can operate as system memory for device 5500, to store data and instructions for use when the one or more processors 5504 executes an application or process. Memory 5530 can store application data, user data, music, photos, documents, or other data, as well as system data (whether long-term or temporary) related to the execution of the applications and functions of device 5500.

Elements of various embodiments and examples are also provided as a machine-readable medium (e.g., memory 5530) for storing the computer-executable instructions (e.g., instructions to implement any other processes discussed herein). The machine-readable medium (e.g., memory 5530) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 5500 comprises temperature measurement circuitries 5540, e.g., for measuring temperature of various components of device 5500. In an example, temperature measurement circuitries 5540 may be embedded, or coupled or attached to various components, whose temperature are to be measured and monitored. For example, temperature measurement circuitries 5540 may measure temperature of (or within) one or more of cores 5508a, 5508b, 5508c, voltage regulator 5514, memory 5530, a mother-board of SoC 5501, and/or any appropriate component of device 5500. In some embodiments, temperature measurement circuitries 5540 include a low power hybrid reverse (LPHR) bandgap reference (BGR) and digital temperature sensor (DTS), which utilizes subthreshold metal oxide semiconductor (MOS) transistor and the PNP parasitic Bi-polar Junction Transistor (BJT) device to form a reverse BGR that serves as the base for configurable BGR or DTS operating modes. The LPHR architecture uses low-cost MOS transistors and the standard parasitic PNP device. Based on a reverse bandgap voltage, the LPHR can work as a configurable BGR. By comparing the configurable BGR with the scaled base-emitter voltage, the circuit can also perform as a DTS with a linear transfer function with single-temperature trim for high accuracy.

In some embodiments, device 5500 comprises power measurement circuitries 5542, e.g., for measuring power consumed by one or more components of the device 5500. In an example, in addition to, or instead of, measuring power, the power measurement circuitries 5542 may measure voltage and/or current. In an example, the power measurement circuitries 5542 may be embedded, or coupled or attached to various components, whose power, voltage, and/or current consumption are to be measured and monitored. For example, power measurement circuitries 5542 may measure power, current and/or voltage supplied by one or more voltage regulators 5514, power supplied to SoC 5501, power supplied to device 5500, power consumed by processor 5504 (or any other component) of device 5500, etc.

In some embodiments, device 5500 comprises one or more voltage regulator circuitries, generally referred to as voltage regulator (VR) 5514. VR 5514 generates signals at appropriate voltage levels, which may be supplied to operate any appropriate components of the device 5500. Merely as an example, VR 5514 is illustrated to be supplying signals to processor 5504 of device 5500. In some embodiments, VR 5514 receives one or more Voltage Identification (VID) signals, and generates the voltage signal at an appropriate level, based on the VID signals. Various type of VRs may be utilized for the VR 5514. For example, VR 5514 may include a "buck" VR, "boost" VR, a combination of buck and boost VRs, low dropout (LDO) regulators, switching DC-DC regulators, constant-on-time controller-based DC-DC regulator, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 5510a/b and/or PMIC 5512. In some embodiments, each core has a network of distributed LDOs to provide efficient control for power management. The LDOs can be digital, analog, or a combination of digital or analog LDOs. In some embodiments, VR 5514 includes current tracking apparatus to measure current through power supply rail(s).

In some embodiments, VR 5514 includes a digital control scheme to manage states of a proportional-integral-derivative (PID) filter (also known as a digital Type-III compensator). The digital control scheme controls the integrator of the PID filter to implement non-linear control of saturating the duty cycle during which the proportional and derivative terms of the PID are set to 0 while the integrator and its internal states (previous values or memory) is set to a duty cycle that is the sum of the current nominal duty cycle plus a deltaD. The deltaD is the maximum duty cycle increment that is used to regulate a voltage regulator from ICCmin to ICCmax and is a configuration register that can be set post silicon. A state machine moves from a non-linear all ON state (which brings the output voltage Vout back to a regulation window) to an open loop duty cycle which maintains the output voltage slightly higher than the required reference voltage Vref. After a certain period in this state of open loop at the commanded duty cycle, the state machine then ramps down the open loop duty cycle value until the output voltage is close to the Vref commanded. As such, output chatter on the output supply from VR 5514 is completely eliminated (or substantially eliminated) and there is merely a single undershoot transition which could lead to a guaranteed Vmin based on a comparator delay and the di/dt of the load with the available output decoupling capacitance.

In some embodiments, VR 5514 includes a separate self-start controller, which is functional without fuse and/or trim information. The self-start controller protects VR 5514 against large inrush currents and voltage overshoots, while being capable of following a variable VID (voltage identification) reference ramp imposed by the system. In some embodiments, the self-start controller uses a relaxation oscillator built into the controller to set the switching frequency of the buck converter. The oscillator can be initialized using either a clock or current reference to be close to a desired operating frequency. The output of VR 5514 is coupled weakly to the oscillator to set the duty cycle for closed loop operation. The controller is naturally biased such that the output voltage is always slightly higher than the set point, eliminating the need for any process, voltage, and/or temperature (PVT) imposed trims.

In some embodiments, device 5500 comprises one or more clock generator circuitries, generally referred to as clock generator 5516. Clock generator 5516 generates clock signals at appropriate frequency levels, which may be supplied to any appropriate components of device 5500. Merely as an example, clock generator 5516 is illustrated to be supplying clock signals to processor 5504 of device 5500. In some embodiments, clock generator 5516 receives one or more Frequency Identification (FID) signals, and generates the clock signals at an appropriate frequency, based on the FID signals.

In some embodiments, device 5500 comprises battery 5518 supplying power to various components of device 5500. Merely as an example, battery 5518 is illustrated to be supplying power to processor 5504. Although not illustrated in the figures, device 5500 may comprise a charging circuitry, e.g., to recharge the battery, based on Alternating Current (AC) power supply received from an AC adapter.

In some embodiments, battery 5518 periodically checks an actual battery capacity or energy with charge to a preset voltage (e.g., 4.1 V). The battery then decides of the battery capacity or energy. If the capacity or energy is insufficient, then an apparatus in or associated with the battery slightly increases charging voltage to a point where the capacity is sufficient (e.g. from 4.1 V to 4.11 V). The process of periodically checking and slightly increase charging voltage is performed until charging voltage reaches specification limit (e.g., 4.2 V). The scheme described herein has benefits such as battery longevity can be extended, risk of insufficient energy reserve can be reduced, burst power can be used as long as possible, and/or even higher burst power can be used.

In some embodiments, battery 5518 is a multi-battery system with workload dependent load-sharing mechanism. The mechanism is an energy management system that operates in three modes—energy saving mode, balancer mode, and turbo mode. The energy saving mode is a normal mode where the multiple batteries (collectively shown as battery 5518) provide power to their own set of loads with least resistive dissipation. In balancing mode, the batteries are connected through switches operating in active mode so that the current shared is inversely proportion to the corresponding battery state-of-charge. In turbo mode, both batteries are connected in parallel through switches (e.g., on-switches) to provide maximum power to a processor or load. In some embodiments, battery 5518 is a hybrid battery which comprising a fast charging battery and a high energy density battery. Fast charging battery (FC) means a battery capable of faster charging than high energy density battery (HE). FC may be today's Li-ion battery as it is capable of faster charging than HE. In some embodiments, a controller (part of battery 5518) optimizes the sequence and charging rate for the hybrid battery to maximize both the charging current and charging speed of the battery, while enabling longer battery life.

In some embodiments, the charging circuitry (e.g., 5518) comprises a buck-boost converter. This buck-boost converter comprises DrMOS or DrGaN devices used in place of half-bridges for traditional buck-boost converters. Various embodiments here are described with reference to DrMOS. However, the embodiments are applicable to DrGaN. The DrMOS devices allow for better efficiency in power conversion due to reduced parasitic and optimized MOSFET packaging. Since the dead-time management is internal to the DrMOS, the dead-time management is more accurate than for traditional buck-boost converters leading to higher efficiency in conversion. Higher frequency of operation allows for smaller inductor size, which in turn reduces the z-height of the charger comprising the DrMOS based buck-boost converter. The buck-boost converter of various embodiments comprises dual-folded bootstrap for DrMOS devices. In some embodiments, in addition to the traditional bootstrap capacitors, folded bootstrap capacitors are added that cross-couple inductor nodes to the two sets of DrMOS switches.

In some embodiments, device 5500 comprises Power Control Unit (PCU) 5510 (also referred to as Power Management Unit (PMU), Power Management Controller (PMC), Power Unit (p-unit), etc.). In an example, some sections of PCU 5510 may be implemented by one or more processing cores 5508, and these sections of PCU 5510 are symbolically illustrated using a dotted box and labelled PCU 5510a. In an example, some other sections of PCU 5510 may be implemented outside the processing cores 5508, and these sections of PCU 5510 are symbolically illustrated using a dotted box and labelled as PCU 5510b. PCU 5510 may implement various power management operations for device 5500. PCU 5510 may include hardware interfaces, hardware circuitries, connectors, registers, etc., as well as software components (e.g., drivers, protocol stacks), to implement various power management operations for device 5500.

In various embodiments, PCU or PMU 5510 is organized in a hierarchical manner forming a hierarchical power management (HPM). HPM of various embodiments builds a capability and infrastructure that allows for package level management for the platform, while still catering to islands of autonomy that might exist across the constituent die in the package. HPM does not assume a pre-determined mapping of physical partitions to domains. An HPM domain can be aligned with a function integrated inside a dielet, to a dielet boundary, to one or more dielets, to a companion die, or even a discrete CXL device. HPM addresses integration of multiple instances of the same die, mixed with proprietary functions or 3rd party functions integrated on the same die or separate die, and even accelerators connected via CXL (e.g., Flexbus) that may be inside the package, or in a discrete form factor.

HPM enables designers to meet the goals of scalability, modularity, and late binding. HPM also allows PMU functions that may already exist on other dice to be leveraged, instead of being disabled in the flat scheme. HPM enables management of any arbitrary collection of functions independent of their level of integration. HPM of various embodiments is scalable, modular, works with symmetric multi-chip processors (MCPs), and works with asymmetric MCPs. For example, HPM does not need a signal PM controller and package infrastructure to grow beyond reasonable scaling limits. HPM enables late addition of a die in a package without the need for change in the base die infrastructure. HPM addresses the need of disaggregated solutions having dies of different process technology nodes coupled in a single package. HPM also addresses the needs of companion die integration solutions—on and off package.

In various embodiments, each die (or dielet) includes a power management unit (PMU) or p-unit. For example, processor dies can have a supervisor p-unit, supervisee p-unit, or a dual role supervisor/supervisee p-unit. In some embodiments, an I/O die has its own dual role p-unit such as supervisor and/or supervisee p-unit. The p-units in each die can be instances of a generic p-unit. In one such example, all p-units have the same capability and circuits, but are configured (dynamically or statically) to take a role of a supervisor, supervisee, and/or both. In some embodiments, the p-units for compute dies are instances of a compute p-unit while p-units for IO dies are instances of an IO p-unit different from the compute p-unit. Depending on the role, p-unit acquires specific responsibilities to manage power of the multichip module and/or computing platform. While various p-units are described for dies in a multichip module or system-on-chip, a p-unit can also be part of an external device such as I/O device.

Here, the various p-units do not have to be the same. The HPM architecture can operate very different types of p-units. One common feature for the p-units is that they are expected to receive HPM messages and are expected to be able to comprehend them. In some embodiments, the p-unit of IO dies may be different than the p-unit of the compute dies. For example, the number of register instances of each class of register in the IO p-unit is different than those in the p-units of the compute dies. An IO die has the capability of being an HPM supervisor for CXL connected devices, but compute die may not need to have that capability. The IO and computes dice also have different firmware flows and possibly different firmware images. These are choices that an implementation can make. An HPM architecture can choose to have one superset firmware image and selectively execute flows that are relevant to the die type the firmware is associated with. Alternatively, there can be a customer firmware for each p-unit type; it can allow for more streamlined sizing of the firmware storage requirements for each p-unit type.

The p-unit in each die can be configured as a supervisor p-unit, supervisee p-unit or with a dual role of supervisor/supervisee. As such, p-units can perform roles of supervisor or supervisee for various domains. In various embodiments, each instance of p-unit is capable of autonomously managing local dedicated resources and contains structures to aggregate data and communicate between instances to enable shared resource management by the instance configured as the shared resource supervisor. A message and wire-based infrastructure is provided that can be duplicated and configured to facilitate management and flows between multiple p-units.

In some embodiments, power and thermal thresholds are communicated by a supervisor p-unit to supervisee p-units. For example, a supervisor p-unit learns of the workload (present and future) of each die, power measurements of each die, and other parameters (e.g., platform level power boundaries) and determines new power limits for each die. These power limits are then communicated by supervisor p-units to the supervisee p-units via one or more interconnects and fabrics. In some embodiments, a fabric indicates a group of fabrics and interconnect including a first fabric, a second fabric, and a fast response interconnect. In some embodiments, the first fabric is used for common communication between a supervisor p-unit and a supervisee p-unit. These common communications include change in voltage, frequency, and/or power state of a die which is planned based on a number of factors (e.g., future workload, user behavior, etc.). In some embodiments, the second fabric is used for higher priority communication between supervisor p-unit and supervisee p-unit. Example of higher priority communication include a message to throttle because of a possible thermal runaway condition, reliability issue, etc. In some embodiments, a fast response interconnect is used for communicating fast or hard throttle of all dies. In this case, a supervisor p-unit may send a fast throttle message to all other p-units, for example. In some embodiments, a fast response interconnect is a legacy interconnect whose function can be performed by the second fabric.

The HPM architecture of various embodiments enables scalability, modularity, and late binding of symmetric and/or asymmetric dies. Here, symmetric dies are dies of same size, type, and/or function, while asymmetric dies are dies of different size, type, and/or function. Hierarchical approach also allows PMU functions that may already exist on other dice to be leveraged, instead of being disabled in the traditional flat power management scheme. HPM does not assume a pre-determined mapping of physical partitions to domains. An HPM domain can be aligned with a function integrated inside a dielet, to a dielet boundary, to one or more dielets, to a companion die, or even a discrete CXL device. HPM enables management of any arbitrary collection of functions independent of their level of integration. In some embodiments, a p-unit is declared a supervisor p-unit based on one or more factors. These factors include memory size, physical constraints (e.g., number of pin-outs), and locations of sensors (e.g., temperature, power consumption, etc.) to determine physical limits of the processor.

The HPM architecture of various embodiments, provides a means to scale power management so that a single p-unit instance does not need to be aware of the entire processor. This enables power management at a smaller granularity and improves response times and effectiveness. Hierarchical structure maintains a monolithic view to the user. For example, at an operating system (OS) level, HPM architecture gives the OS a single PMU view even though the PMU is physically distributed in one or more supervisor-supervisee configurations.

In some embodiments, the HPM architecture is centralized where one supervisor controls all supervisees. In some embodiments, the HPM architecture is decentralized, wherein various p-units in various dies control overall power management by peer-to-peer communication. In some embodiments, the HPM architecture is distributed where there are different supervisors for different domains. One example of a distributed architecture is a tree-like architecture.

In some embodiments, device 5500 comprises Power Management Integrated Circuit (PMIC) 5512, e.g., to implement various power management operations for device 5500. In some embodiments, PMIC 5512 is a Reconfigurable Power Management ICs (RPMICs) and/or an IMVP (Intel® Mobile Voltage Positioning). In an example, the PMIC is within an IC die separate from processor 5504. The may implement various power management operations for device 5500. PMIC 5512 may include hardware interfaces, hardware circuitries, connectors, registers, etc., as well as software components (e.g., drivers, protocol stacks), to implement various power management operations for device 5500.

In an example, device 5500 comprises one or both PCU 5510 or PMIC 5512. In an example, any one of PCU 5510 or PMIC 5512 may be absent in device 5500, and hence, these components are illustrated using dotted lines.

Various power management operations of device 5500 may be performed by PCU 5510, by PMIC 5512, or by a combination of PCU 5510 and PMIC 5512. For example, PCU 5510 and/or PMIC 5512 may select a power state (e.g., P-state) for various components of device 5500. For example, PCU 5510 and/or PMIC 5512 may select a power state (e.g., in accordance with the ACPI (Advanced Configuration and Power Interface) specification) for various components of device 5500. Merely as an example, PCU 5510 and/or PMIC 5512 may cause various components of the device 5500 to transition to a sleep state, to an active state, to an appropriate C state (e.g., C0 state, or another appropriate C state, in accordance with the ACPI specification), etc. In an example, PCU 5510 and/or PMIC 5512 may control a voltage output by VR 5514 and/or a frequency of a clock signal output by the clock generator, e.g., by outputting the VID signal and/or the FID signal, respectively. In an example, PCU 5510 and/or PMIC 5512 may control battery power usage, charging of battery 5518, and features related to power saving operation.

The clock generator 5516 can comprise a phase locked loop (PLL), frequency locked loop (FLL), or any suitable clock source. In some embodiments, each core of processor 5504 has its own clock source. As such, each core can operate at a frequency independent of the frequency of operation of the other core. In some embodiments, PCU 5510 and/or PMIC 5512 performs adaptive or dynamic frequency scaling or adjustment. For example, clock frequency of a processor core can be increased if the core is not operating at its maximum power consumption threshold or limit. In some embodiments, PCU 5510 and/or PMIC 5512 determines the operating condition of each core of a processor, and opportunistically adjusts frequency and/or power supply voltage of that core without the core clocking source (e.g., PLL of that core) losing lock when the PCU 5510 and/or PMIC 5512 determines that the core is operating below a target performance level. For example, if a core is drawing current from a power supply rail less than a total current allocated for that core or processor 5504, then PCU 5510 and/or PMIC 5512 can temporality increase the power draw for that core or processor 5504 (e.g., by increasing clock frequency and/or power supply voltage level) so that the core or processor 5504 can perform at higher performance level. As such, voltage and/or frequency can be increased temporality for processor 5504 without violating product reliability.

In an example, PCU 5510 and/or PMIC 5512 may perform power management operations, e.g., based at least in part on receiving measurements from power measurement circuitries 5542, temperature measurement circuitries 5540, charge level of battery 5518, and/or any other appropriate information that may be used for power management. To that end, PMIC 5512 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor (s) may be directly coupled to PCU 5510 and/or PMIC 5512 in at least one embodiment to allow PCU 5510 and/or PMIC 5512 to manage processor core energy at least in part based on value(s) detected by one or more of the sensors.

Also illustrated is an example software stack of device 5500 (although not all elements of the software stack are illustrated). Merely as an example, processors 5504 may execute application programs 5550, Operating System 5552, one or more Power Management (PM) specific application programs (e.g., generically referred to as PM applications 5558), and/or the like. PM applications 5558 may also be executed by the PCU 5510 and/or PMIC 5512. OS 5552 may also include one or more PM applications 5556a, 5556b, 5556c. The OS 5552 may also include various drivers 5554a, 5554b, 5554c, etc., some of which may be specific for power management purposes. In some embodiments, device 5500 may further comprise a Basic Input/output System (BIOS) 5520. BIOS 5520 may communicate with OS 5552 (e.g., via one or more drivers 5554), communicate with processors 5504, etc.

For example, one or more of PM applications 5558, 5556, drivers 5554, BIOS 5520, etc. may be used to implement power management specific tasks, e.g., to control voltage and/or frequency of various components of device 5500, to control wake-up state, sleep state, and/or any other appropriate power state of various components of device 5500, control battery power usage, charging of the battery 5518, features related to power saving operation, etc.

In some embodiments, battery 5518 is a Li-metal battery with a pressure chamber to allow uniform pressure on a battery. The pressure chamber is supported by metal plates (such as pressure equalization plate) used to give uniform pressure to the battery. The pressure chamber may include pressured gas, elastic material, spring plate, etc. The outer skin of the pressure chamber is free to bow, restrained at its edges by (metal) skin, but still exerts a uniform pressure on the plate that is compressing the battery cell. The pressure chamber gives uniform pressure to battery, which is used to enable high-energy density battery with, for example, 20% more battery life.

In some embodiments, battery 5518 includes hybrid technologies. For example, a mix of high energy density charge (e.g., Li-Ion batteries) carrying device(s) and low energy density charge carrying devices (e.g., supercapacitor) are used as batteries or storage devices. In some embodiments, a controller (e.g., hardware, software, or a combination of them) is used analyze peak power patterns and minimizes the impact to overall lifespan of high energy density charge carrying device-based battery cells while maximizing service time for peak power shaving feature. The controller may be part of battery 5518 or part of p-unit 5510b.

In some embodiments, pCode executing on PCU 5510a/b has a capability to enable extra compute and telemetries resources for the runtime support of the pCode. Here pCode refers to a firmware executed by PCU 5510a/b to manage performance of the SoC 5501. For example, pCode may set frequencies and appropriate voltages for the processor. Part of the pCode are accessible via OS 5552. In various embodiments, mechanisms and methods are provided that dynamically change an Energy Performance Preference (EPP) value based on workloads, user behavior, and/or system conditions. There may be a well-defined interface between OS 5552 and the pCode. The interface may allow or facilitate the software configuration of several parameters and/or may provide hints to the pCode. As an example, an EPP parameter may inform a pCode algorithm as to whether performance or battery life is more important.

This support may be done as well by the OS 5552 by including machine-learning support as part of OS 5552 and either tuning the EPP value that the OS hints to the hardware (e.g., various components of SoC 5501) by machine-learning prediction, or by delivering the machine-learning prediction to the pCode in a manner similar to that done by a Dynamic Tuning Technology (DTT) driver. In this model, OS 5552 may have visibility to the same set of telemetries as are available to a DTT. As a result of a DTT machine-learning hint setting, pCode may tune its internal algorithms to achieve optimal power and performance results following the machine-learning prediction of activation type. The pCode as example may increase the responsibility for the processor utilization change to enable fast response for user activity, or may increase the bias for energy saving either by reducing the responsibility for the processor utilization or by saving more power and increasing the performance lost by tuning the energy saving optimization. This approach may facilitate saving more battery life in case the types of activities enabled lose some performance level over what the system can enable. The pCode may include an algorithm for dynamic EPP that may take the two inputs, one from OS 5552 and the other from software such as DTT, and may selectively choose to provide higher performance and/or responsiveness. As part of this method, the pCode may enable in the DTT an option to tune its reaction for the DTT for different types of activity.

In some embodiments, pCode improves the performance of the SoC in battery mode. In some embodiments, pCode allows drastically higher SoC peak power limit levels (and thus higher Turbo performance) in battery mode. In some embodiments, pCode implements power throttling and is part of Intel's Dynamic Tuning Technology (DTT). In various embodiments, the peak power limit is referred to PL4. However, the embodiments are applicable to other peak power limits. In some embodiments, pCode sets the Vth threshold voltage (the voltage level at which the platform will throttle the SoC) in such a way as to prevent the system from unexpected shutdown (or black screening). In some embodiments, pCode calculates the Psoc,pk SoC Peak Power Limit (e.g., PL4), according to the threshold voltage (Vth). These are two dependent parameters, if one is set, the other can be calculated. pCode is used to optimally set one parameter (Vth) based on the system parameters, and the history of the operation. In some embodiments, pCode provides a scheme to dynamically calculate the throttling level (Psoc,th) based on the available battery power (which changes slowly) and set the SoC throttling peak power (Psoc,th). In some embodiments, pCode decides the frequencies and voltages based on Psoc,th. In this case, throttling events have less negative effect on the SoC performance Various embodiments provide a scheme which allows maximum performance (Pmax) framework to operate.

In some embodiments, VR 5514 includes a current sensor to sense and/or measure current through a high-side switch of VR 5514. In some embodiments the current sensor uses an amplifier with capacitively coupled inputs in feedback to sense the input offset of the amplifier, which can be compensated for during measurement. In some embodiments, the amplifier with capacitively coupled inputs in feedback is used to operate the amplifier in a region where the input common-mode specifications are relaxed, so that the feedback loop gain and/or bandwidth is higher. In some embodiments, the amplifier with capacitively coupled inputs in feedback is used to operate the sensor from the converter input voltage by employing high-PSRR (power supply rejection ratio) regulators to create a local, clean supply voltage, causing less disruption to the power grid in the switch area. In some embodiments, a variant of the design can be used to sample the difference between the input voltage and the controller supply, and recreate that between the drain voltages of the power and replica switches. This allows the sensor to not be exposed to the power supply voltage. In some embodiments, the amplifier with capacitively coupled inputs in feedback is used to compensate for power delivery network related (PDN-related) changes in the input voltage during current sensing.

Some embodiments use three components to adjust the peak power of SoC 5501 based on the states of a USB TYPE-C device 5529. These components include OS Peak Power Manager (part of OS 5552), USB TYPE-C Connector Manager (part of OS 5552), and USB TYPE-C Protocol Device Driver (e.g., one of drivers 5554*a*, 5554*b*, 5554*c*). In some embodiments, the USB TYPE-C Connector Manager sends a synchronous request to the OS Peak Power Manager when a USB TYPE-C power sink device is attached or detached from SoC 5501, and the USB TYPE-C Protocol Device Driver sends a synchronous request to the Peak Power Manager when the power sink transitions device state. In some embodiments, the Peak Power Manager takes power budget from the CPU when the USB TYPE-C connector is attached to a power sink and is active (e.g., high power device state). In some embodiments, the Peak Power Manager gives back the power budget to the CPU for performance when the USB TYPE-C connector is either detached or the attached and power sink device is idle (lowest device state).

In some embodiments, logic is provided to dynamically pick the best operating processing core for BIOS power-up flows and sleep exit flows (e.g., S3, S4, and/or S5). The selection of the bootstrap processor (BSP) is moved to an early power-up time instead of a fixed hardware selection at any time. For maximum boot performance, the logic selects the fastest capable core as the BSP at an early power-up time. In addition, for maximum power saving, the logic selects the most power efficient core as the BSP. Processor or switching for selecting the BSP happens during the boot-up as well as power-up flows (e.g., S3, S4, and/or S5 flows).

In some embodiments, the memories herein are organized in multi-level memory architecture and their performance is governed by a decentralized scheme. The decentralized scheme includes p-unit 5510 and memory controllers. In some embodiments, the scheme dynamically balances a number of parameters such as power, thermals, cost, latency and performance for memory levels that are progressively further away from the processor in device or platform 5500 based on how applications are using memory levels that are further away from processor cores. In some examples, the decision making for the state of the far memory (FM) is decentralized. For example, a processor power management unit (p-unit), near memory controller (NMC), and/or far memory host controller (FMHC) makes decisions about the power and/or performance state of the FM at their respective levels. These decisions are coordinated to provide the most optimum power and/or performance state of the FM for a given time. The power and/or performance state of the memories adaptively change to changing workloads and other parameters even when the processor(s) is in a particular power state.

In some embodiments, a hardware and software coordinated processor power state policy (e.g., policy for C-state) is implemented that delivers optimal power state selection by taking in to account the performance and/or responsiveness needs of thread expected to be scheduled on the core entering idle, to achieve improved instructions per cycle (IPC) and performance for cores running user critical tasks. The scheme provides the ability to deliver responsiveness gains for important and/or user-critical threads running on a system-on-chip. P-unit 5510 which coupled to the plurality of processing cores, receives a hint from operating system 5552 indicative of a bias towards a power state or performance state for at least one of the processing cores of the plurality of processing cores based on a priority of a thread in context switch.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e g, immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "analog signal" is any continuous signal for which the time varying feature (variable) of the signal is a representation of some other time varying quantity, i.e., analogous to another time varying signal.

The term "digital signal" is a physical signal that is a representation of a sequence of discrete values (a quantified discrete-time signal), for example of an arbitrary bit stream, or of a digitized (sampled and analog-to-digital converted) analog signal.

The term "scaling" generally refers to converting a design (schematic and layout) from one process technology to another process technology and may be subsequently being reduced in layout area. In some cases, scaling also refers to upsizing a design from one process technology to another process technology and may be subsequently increasing layout area. The term "scaling" generally also refers to downsizing or upsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

Here the term "die" generally refers to a single continuous piece of semiconductor material (e.g. silicon) where transistors or other components making up a processor core may reside. Multi-core processors may have two or more processors on a single die, but alternatively, the two or more processors may be provided on two or more respective dies. Each die has a dedicated power controller or power control unit (p-unit) power controller or power control unit (p-unit) which can be dynamically or statically configured as a supervisor or supervisee. In some examples, dies are of the same size and functionality i.e., symmetric cores. However, dies can also be asymmetric. For example, some dies have different size and/or function than other dies. Each processor may also be a dielet or chiplet.

Here the term "dielet" or "chiplet" generally refers to a physically distinct semiconductor die, typically connected to an adjacent die in a way that allows the fabric across a die boundary to function like a single fabric rather than as two distinct fabrics. Thus at least some dies may be dielets. Each dielet may include one or more p-units which can be dynamically or statically configured as a supervisor, supervisee or both.

Here the term "fabric" generally refers to communication mechanism having a known set of sources, destinations, routing rules, topology and other properties. The sources and destinations may be any type of data handling functional unit such as power management units. Fabrics can be two-dimensional spanning along an x-y plane of a die and/or three-dimensional (3D) spanning along an x-y-z plane of a stack of vertical and horizontally positioned dies. A single fabric may span multiple dies. A fabric can take any topology such as mesh topology, star topology, daisy chain topology. A fabric may be part of a network-on-chip (NoC) with multiple agents. These agents can be any functional unit.

Here, the term "processor core" generally refers to an independent execution unit that can run one program thread at a time in parallel with other cores. A processor core may include a dedicated power controller or power control unit (p-unit) which can be dynamically or statically configured as a supervisor or supervisee. This dedicated p-unit is also referred to as an autonomous p-unit, in some examples. In some examples, all processor cores are of the same size and functionality i.e., symmetric cores. However, processor cores can also be asymmetric. For example, some processor cores have different size and/or function than other processor cores. A processor core can be a virtual processor core or a physical processor core.

Here, the term "interconnect" refers to a communication link, or channel, between two or more points or nodes. It may comprise one or more separate conduction paths such as wires, vias, waveguides, passive components, and/or active components. It may also comprise a fabric. In some embodiments, a p-unit is coupled to an OS via an interface.

Here the term "interface" generally refers to software and/or hardware used to communicate with an interconnect. An interface may include logic and I/O driver/receiver to send and receive data over the interconnect or one or more wires.

Here the term "domain" generally refers to a logical or physical perimeter that has similar properties (e.g., supply voltage, operating frequency, type of circuits or logic, and/or workload type) and/or is controlled by a particular agent. For example, a domain may be a group of logic units or function units that are controlled by a particular supervisor. A domain may also be referred to an Autonomous Perimeter (AP). A domain can be an entire system-on-chip (SoC) or part of the SoC, and is governed by a p-unit.

Here the term "supervisor" generally refers to a power controller, or power management, unit (a "p-unit"), which monitors and manages power and performance related parameters for one or more associated power domains, either alone or in cooperation with one or more other p-units. Power/performance related parameters may include but are not limited to domain power, platform power, voltage, voltage domain current, die current, load-line, temperature, device latency, utilization, clock frequency, processing efficiency, current/future workload information, and other parameters. It may determine new power or performance parameters (limits, average operational, etc.) for the one or more domains. These parameters may then be communicated to supervisee p-units, or directly to controlled or monitored entities such as VR or clock throttle control registers, via one or more fabrics and/or interconnects. A supervisor learns of the workload (present and future) of one or more dies, power measurements of the one or more dies, and other parameters (e.g., platform level power boundaries) and determines new power limits for the one or more dies. These power limits are then communicated by supervisor p-units to the supervisee p-units via one or more fabrics and/or interconnect. In examples where a die has one p-unit, a supervisor (Svor) p-unit is also referred to as supervisor die.

Here the term "supervisee" generally refers to a power controller, or power management, unit (a "p-unit"), which monitors and manages power and performance related parameters for one or more associated power domains, either alone or in cooperation with one or more other p-units and receives instructions from a supervisor to set power and/or performance parameters (e.g., supply voltage, operating frequency, maximum current, throttling threshold, etc.) for its associated power domain. In examples where a die has one p-unit, a supervisee (Svee) p-unit may also be referred to as a supervisee die. Note that a p-unit may serve either as a Svor, a Svee, or both a Svor/Svee p-unit.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process. The examples can be combined in any combinations. For example, example 4 can be combined with example 2.

Example 1

An apparatus comprising: a first circuitry to monitor a supply voltage and to generate a first code indicative of a digital representation of the supply voltage; a second circuitry to receive the first code and to determine whether the supply voltage drooped, and to generate a droop indication if the supply voltage drooped; a third circuitry to receive the first code or a version of the first code along with the droop indication, wherein the third circuitry is to generate a second code according to the first code or a version of the first code and the droop indication; and power gates (PGs) coupled to an input supply voltage rail and an output supply voltage rail, wherein the PGs are controlled by the second code or a version of the second code.

Example 2

The apparatus of example 1, wherein the first circuitry comprises an all-digital voltage monitor, which includes: a frequency divider to receive an input clock and to generate a frequency divided clock; a delay chain comprising delay cells, wherein the delay chain is to receive the frequency divided clock at an input of the delay chain; a plurality of sequential circuitries, wherein each of the sequential circuitries is coupled to an output of an individual delay cell of the delay chain; and a selection circuitry coupled to the plurality of sequential circuitries, wherein the selection circuitry includes a multiple of multiplexers, wherein each multiplexer is coupled to an individual sequential circuitry of the plurality of sequential circuitries.

Example 3

The apparatus of example 2, wherein the all-digital voltage monitor includes a circuitry to suppress metastability-induced bubble in outputs of the selection circuitry.

Example 4

The apparatus of example 1, wherein the second circuitry includes: a comparator to compare the first code with a threshold; a multiplexer to receive an output of the comparator and an output of a sequential circuit, wherein an output of the multiplexer is input to the sequential circuit; and an OR logic gate coupled to the output of the sequential circuit and to the output of the multiplexer, wherein the output of the OR logic gate is the droop indication.

Example 5

The apparatus of example 1, wherein the third circuitry comprises a proportional-integral-derivative (PID) controller.

Example 6

The apparatus of example 5, wherein the PID controller is to asynchronously enable a predetermined number of PGs once the droop indication is realized.

Example 7

The apparatus of example 6, wherein the PID controller continues normal PID control to dial down strength of the PGs starting from the predetermined number of PGs for stable operation.

Example 8

The apparatus of example 6, wherein the predetermined number of PGs is a maximum number of PGs.

Example 9

The apparatus of example 1, wherein the first code is a thermometer code, and wherein the version of the first code is a binary code that represents the thermometer code.

Example 10

The apparatus of example 1, wherein the second code is a binary code, and wherein the version of the second code is a thermometer code that represents the binary code.

Example 11

An apparatus comprising: an all-digital proportional-integral-derivative (PID) controller that receives a first code indicative of a voltage behavior on a power supply rail; a droop detector to compare the first code with a threshold to determine a droop event, wherein information about the droop event is provided to the PID controller, wherein the PID controller generates a second code according to the first code and the information about the droop event; and a plurality of power gates that receive the second code.

Example 12

The apparatus of example 11, wherein droop detector comprises: a comparator to compare the first code with a threshold; a multiplexer to receive an output of the comparator and an output of a sequential circuit, wherein an output of the multiplexer is input to the sequential circuit; and an OR logic gate coupled to the output of the sequential circuit and to the output of the multiplexer, wherein the output of the OR logic gate is the droop indication.

Example 13

The apparatus of example 11, wherein the code is generated by an all-digital voltage monitor, which includes: a frequency divider to receive an input clock and to generate a frequency divided clock; a delay chain comprising delay cells, wherein the delay chain is to receive the frequency divided clock at an input of the delay chain; a plurality of sequential circuitries, wherein each of the sequential circuitries is coupled to an output of an individual delay cell of the delay chain; and a selection circuitry coupled to the plurality of sequential circuitries, wherein the selection circuitry includes a multiple of multiplexers, wherein each multiplexer is coupled to an individual sequential circuitry of the plurality of sequential circuitries.

Example 14

The apparatus of example 13, wherein the all-digital voltage monitor includes a circuitry to suppress metastability-induced bubble in outputs of the selection circuitry.

Example 15

The apparatus of example 11, wherein the PID controller is to asynchronously enable a predetermined number of power gates once the droop indication is realized.

Example 16

The apparatus of example 15, wherein the PID controller continues normal PID control to dial down strength of the power gates starting from the predetermined number of power gates for stable operation.

Example 17

The apparatus of example 15, wherein the predetermined number of power gates is a maximum number of power gates.

Example 18

A system comprising: a memory; a processor coupled to the memory; and a wireless interface to allow the processor to communicate with another device, wherein the processor includes a logic domain which includes a plurality of digital low dropout (DLDO) regulators distributed in the logic domain, wherein an individual DLDO regulator comprises: a first circuitry to monitor a supply voltage and to generate a first code indicative of a digital representation of the supply voltage; a second circuitry to receive the first code and to determine whether the supply voltage drooped, and to generate a droop indication if the supply voltage drooped; a third circuitry to receive the first code or a version of the first code along with the droop indication, wherein the third circuitry is to generate a second code according to the first code or a version of the first code and the droop indication; and power gates (PGs) coupled to an input supply voltage rail and an output supply voltage rail, wherein the PGs are controlled by the second code or a version of the second code.

Example 19

The system of example 18, wherein the second circuitry includes: a comparator to compare the first code with a threshold; a multiplexer to receive an output of the comparator and an output of a sequential circuit, wherein an output of the multiplexer is input to the sequential circuit; and an OR logic gate coupled to the output of the sequential circuit and to the output of the multiplexer, wherein the output of the OR logic gate is the droop indication.

Example 20

The system of example 18, wherein: the third circuitry comprises a proportional-integral-derivative (PID) controller; the PID controller is to asynchronously enable a predetermined number of PGs once the droop indication is realized; the PID controller continues normal PID control to dial down strength of the PGs starting from the predetermined number of PGs for stable operation; and the predetermined number of PGs is a maximum number of PGs.

Example 21

The system of example 18, wherein the individual DLDO regulator is to regulate a single supply voltage on a shared power delivery network.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus comprising:
   a first circuitry to monitor a supply voltage and to generate a first code indicative of a digital representation of the supply voltage;
   a second circuitry to receive the first code and to determine whether the supply voltage drooped, and to generate a droop indication if the supply voltage drooped;
   a third circuitry to receive the first code or a version of the first code along with the droop indication, wherein the third circuitry is to generate a second code according to the first code or a version of the first code and the droop indication; and
   power gates (PGs) coupled to an input supply voltage rail and an output supply voltage rail, wherein the PGs are controlled by the second code or a version of the second code.

2. The apparatus of claim 1, wherein the first circuitry comprises an all-digital voltage monitor, which includes:
   a frequency divider to receive an input clock and to generate a frequency divided clock;
   a delay chain comprising delay cells, wherein the delay chain is to receive the frequency divided clock at an input of the delay chain;
   a plurality of sequential circuitries, wherein each of the sequential circuitries is coupled to an output of an individual delay cell of the delay chain; and
   a selection circuitry coupled to the plurality of sequential circuitries, wherein the selection circuitry includes a multiple of multiplexers, wherein each multiplexer is coupled to an individual sequential circuitry of the plurality of sequential circuitries.

3. The apparatus of claim 2, wherein the all-digital voltage monitor includes a circuitry to suppress metastability-induced bubble in outputs of the selection circuitry.

4. The apparatus of claim 1, wherein the second circuitry includes:
   a comparator to compare the first code with a threshold;
   a multiplexer to receive an output of the comparator and an output of a sequential circuit, wherein an output of the multiplexer is input to the sequential circuit; and
   an OR logic gate coupled to the output of the sequential circuit and to the output of the multiplexer, wherein the output of the OR logic gate is the droop indication.

5. The apparatus of claim 1, wherein the third circuitry comprises a proportional-integral-derivative (PID) controller.

6. The apparatus of claim 5, wherein the PID controller is to asynchronously enable a predetermined number of PGs once the droop indication is realized.

7. The apparatus of claim 6, wherein the PID controller continues normal PID control to dial down strength of the PGs starting from the predetermined number of PGs for stable operation.

8. The apparatus of claim 6, wherein the predetermined number of PGs is a maximum number of PGs.

9. The apparatus of claim 1, wherein the first code is a thermometer code, and wherein the version of the first code is a binary code that represents the thermometer code.

10. The apparatus of claim 1, wherein the second code is a binary code, and wherein the version of the second code is a thermometer code that represents the binary code.

11. An apparatus comprising:
    an all-digital proportional-integral-derivative (PID) controller that receives a first code indicative of a voltage behavior on a power supply rail;
    a droop detector to compare the first code with a threshold to determine a droop event, wherein information about the droop event is provided to the PID controller, wherein the PID controller generates a second code according to the first code and the information about the droop event; and
    a plurality of power gates that receive the second code.

12. The apparatus of claim 11, wherein droop detector comprises:
    a comparator to compare the first code with a threshold;
    a multiplexer to receive an output of the comparator and an output of a sequential circuit, wherein an output of the multiplexer is input to the sequential circuit; and
    an OR logic gate coupled to the output of the sequential circuit and to the output of the multiplexer, wherein the output of the OR logic gate is the droop indication.

13. The apparatus of claim 11, wherein the code is generated by an all-digital voltage monitor, which includes:
    a frequency divider to receive an input clock and to generate a frequency divided clock;
    a delay chain comprising delay cells, wherein the delay chain is to receive the frequency divided clock at an input of the delay chain;
    a plurality of sequential circuitries, wherein each of the sequential circuitries is coupled to an output of an individual delay cell of the delay chain; and
    a selection circuitry coupled to the plurality of sequential circuitries, wherein the selection circuitry includes a multiple of multiplexers, wherein each multiplexer is coupled to an individual sequential circuitry of the plurality of sequential circuitries.

14. The apparatus of claim 13, wherein the all-digital voltage monitor includes a circuitry to suppress metastability-induced bubble in outputs of the selection circuitry.

15. The apparatus of claim 11, wherein the PID controller is to asynchronously enable a predetermined number of power gates once the droop indication is realized.

16. The apparatus of claim 15, wherein the PID controller continues normal PID control to dial down strength of the power gates starting from the predetermined number of power gates for stable operation.

17. The apparatus of claim 15, wherein the predetermined number of power gates is a maximum number of power gates.

18. A system comprising:
a memory;
a processor coupled to the memory; and
a wireless interface to allow the processor to communicate with another device, wherein the processor includes a logic domain which includes a plurality of digital low dropout (DLDO) regulators distributed in the logic domain, wherein an individual DLDO regulator comprises:
- a first circuitry to monitor a supply voltage and to generate a first code indicative of a digital representation of the supply voltage;
- a second circuitry to receive the first code and to determine whether the supply voltage drooped, and to generate a droop indication if the supply voltage drooped;
- a third circuitry to receive the first code or a version of the first code along with the droop indication, wherein the third circuitry is to generate a second code according to the first code or a version of the first code and the droop indication; and
- power gates (PGs) coupled to an input supply voltage rail and an output supply voltage rail, wherein the PGs are controlled by the second code or a version of the second code.

19. The system of claim 18, wherein the second circuitry includes:
- a comparator to compare the first code with a threshold;
- a multiplexer to receive an output of the comparator and an output of a sequential circuit, wherein an output of the multiplexer is input to the sequential circuit; and
- an OR logic gate coupled to the output of the sequential circuit and to the output of the multiplexer, wherein the output of the OR logic gate is the droop indication.

20. The system of claim 18, wherein:
the third circuitry comprises a proportional-integral-derivative (PID) controller;
the PID controller is to asynchronously enable a predetermined number of PGs once the droop indication is realized;
the PID controller continues normal PID control to dial down strength of the PGs starting from the predetermined number of PGs for stable operation; and
the predetermined number of PGs is a maximum number of PGs.

21. The system of claim 18, wherein the individual DLDO regulator is to regulate a single supply voltage on a shared power delivery network.

* * * * *